United States Patent
Hong et al.

(10) Patent No.: US 9,900,921 B2
(45) Date of Patent: Feb. 20, 2018

(54) COMMUNICATION CONTROL METHOD, ELECTRONIC DEVICE, AND STORAGE MEDIUM

(71) Applicant: Samsung Electronics Co., Ltd., Suwon-si, Gyeonggi-do (KR)

(72) Inventors: Moon-Ki Hong, Yongin-si (KR); Woo-Jin Park, Yongin-si (KR); Min-Ji Park, Gwangmyeong-si (KR); So-Young Youn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 14/815,052

(22) Filed: Jul. 31, 2015

(65) Prior Publication Data
US 2016/0044728 A1 Feb. 11, 2016

(30) Foreign Application Priority Data
Aug. 7, 2014 (KR) .......................... 10-2014-0101777

(51) Int. Cl.
| | |
|---|---|
| *H04W 76/02* | (2009.01) |
| *H04W 4/00* | (2009.01) |
| *H04W 8/00* | (2009.01) |
| *H04W 72/04* | (2009.01) |
| *H04W 88/06* | (2009.01) |

(52) U.S. Cl.
CPC ......... *H04W 76/023* (2013.01); *H04W 4/008* (2013.01); *H04W 8/005* (2013.01); *H04W 72/04* (2013.01); *H04W 88/06* (2013.01)

(58) Field of Classification Search
CPC combination set(s) only.
See application file for complete search history.

(56) References Cited

U.S. PATENT DOCUMENTS

| | | | |
|---|---|---|---|
| 2006/0258289 A1* | 11/2006 | Dua | ............... G06F 17/30058 455/41.3 |
| 2008/0086528 A1 | 4/2008 | Garg et al. | |
| 2009/0298428 A1 | 12/2009 | Shin | |
| 2012/0099566 A1* | 4/2012 | Laine | ................. H04M 1/7253 370/338 |
| 2012/0171951 A1 | 7/2012 | Hooft | |
| 2012/0265913 A1* | 10/2012 | Suumaki | ............... H04W 4/008 710/303 |
| 2013/0036231 A1* | 2/2013 | Suumaki | ................. H04L 63/18 709/228 |

(Continued)

FOREIGN PATENT DOCUMENTS

| | | |
|---|---|---|
| EP | 1 511 237 A2 | 3/2005 |
| WO | 2014/057465 A1 | 4/2014 |

Primary Examiner — Yee Lam
(74) Attorney, Agent, or Firm — Jefferson IP Law, LLP

(57) ABSTRACT

A method of controlling communication of an electronic device is provided. The method includes detecting a first peripheral device through a first communication module of the electronic device, which supports a first communication type, acquiring group information on a group of peripheral devices, to which the first peripheral device belongs, based on first identification information of the first peripheral device, and detecting a second peripheral device belonging to the group through a second communication module of the electronic device, which supports a second communication type, based on the group information.

17 Claims, 12 Drawing Sheets

(56) References Cited

U.S. PATENT DOCUMENTS

| | | | |
|---|---|---|---|
| 2013/0309971 A1* | 11/2013 | Kiukkonen | H04L 63/107 455/41.2 |
| 2014/0040490 A1 | 2/2014 | Harris et al. | |
| 2014/0068719 A1* | 3/2014 | Kiukkonen | H04W 12/08 726/4 |
| 2014/0075523 A1* | 3/2014 | Tuomaala | H04L 63/083 726/6 |
| 2014/0079043 A1* | 3/2014 | Montemurro | H04W 52/0216 370/338 |
| 2014/0192681 A1 | 7/2014 | Hong et al. | |
| 2014/0195654 A1* | 7/2014 | Kiukkonen | H04W 8/00 709/220 |
| 2014/0206346 A1* | 7/2014 | Kiukkonen | H04W 52/0229 455/426.1 |
| 2015/0038086 A1* | 2/2015 | Kim | H04W 4/008 455/41.3 |

\* cited by examiner

COMMUNICATION CONTROL METHOD, ELECTRONIC DEVICE, AND STORAGE MEDIUM

CROSS-REFERENCE TO RELATED APPLICATION(S)

This application claims the benefit under 35 U.S.C. § 119(a) of a Korean patent application filed on Aug. 7, 2014 in the Korean Intellectual Property Office and assigned Serial number 10-2014-0101777, the entire disclosure of which is hereby incorporated by reference.

TECHNICAL FIELD

The present disclosure relates to an electronic device having a communication function. More particularly, the present disclosure relates to a method and apparatus for performing communication using, for example, a plurality of communication modules.

BACKGROUND

Electronic devices (for example, smart phones) may include a plurality of communication modules to support various communication schemes, such as for example, wireless fidelity (Wi-Fi), Wi-Fi direct, Bluetooth (BT), near field communication (NFC), a global positioning system (GPS), cellular communication (for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like), and the like.

The above information is presented as background information only to assist with an understanding of the present disclosure. No determination has been made, and no assertion is made, as to whether any of the above might be applicable as prior art with regard to the present disclosure.

SUMMARY

A user can receive various services through connections with peripheral devices which support different communication types, but in this case, since a corresponding communication module should be manually activated whenever a connection with a peripheral device is required, a user may feel inconvenience.

Aspects of the present disclosure are to address at least the above-mentioned problems and/or disadvantages and to provide at least the advantages described below. Accordingly, an aspect of the present disclosure is to provide a communication method and apparatus for solving the above-described problem or the other problems.

In accordance with an aspect of the present disclosure, a communication control method of an electronic device is provided. The method includes detecting, by a processor of the electronic device, a first peripheral device through a first communication module, of the electronic device, which supports a first communication type, acquiring group information on a group of peripheral devices, to which the first peripheral device belongs, based on first identification information of the first peripheral device, and detecting a second peripheral device belonging to the group through a second communication module, of the electronic device, which supports a second communication type, based on the group information.

In accordance with an aspect of the present disclosure, an electronic device is provided. The electronic device includes a first communication module configured to support a first communication type, a second communication module configured to support a second communication module, and a processor configured to detect a first peripheral device through the first communication module, to acquire group information on a group of peripheral devices, to which the first peripheral device belongs, based on first identification information of the first peripheral device, and to detect a second peripheral device belonging to the group through the second communication module based on the group information.

Another aspect of the present disclosure is to provide different communication types of various services to a user through activation and connection of communication modules using group information.

Another aspect of the present disclosure is to provide a location-based service through activation and connection of communication modules using group information even in an environment in which location recognition information and infrastructure are not provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
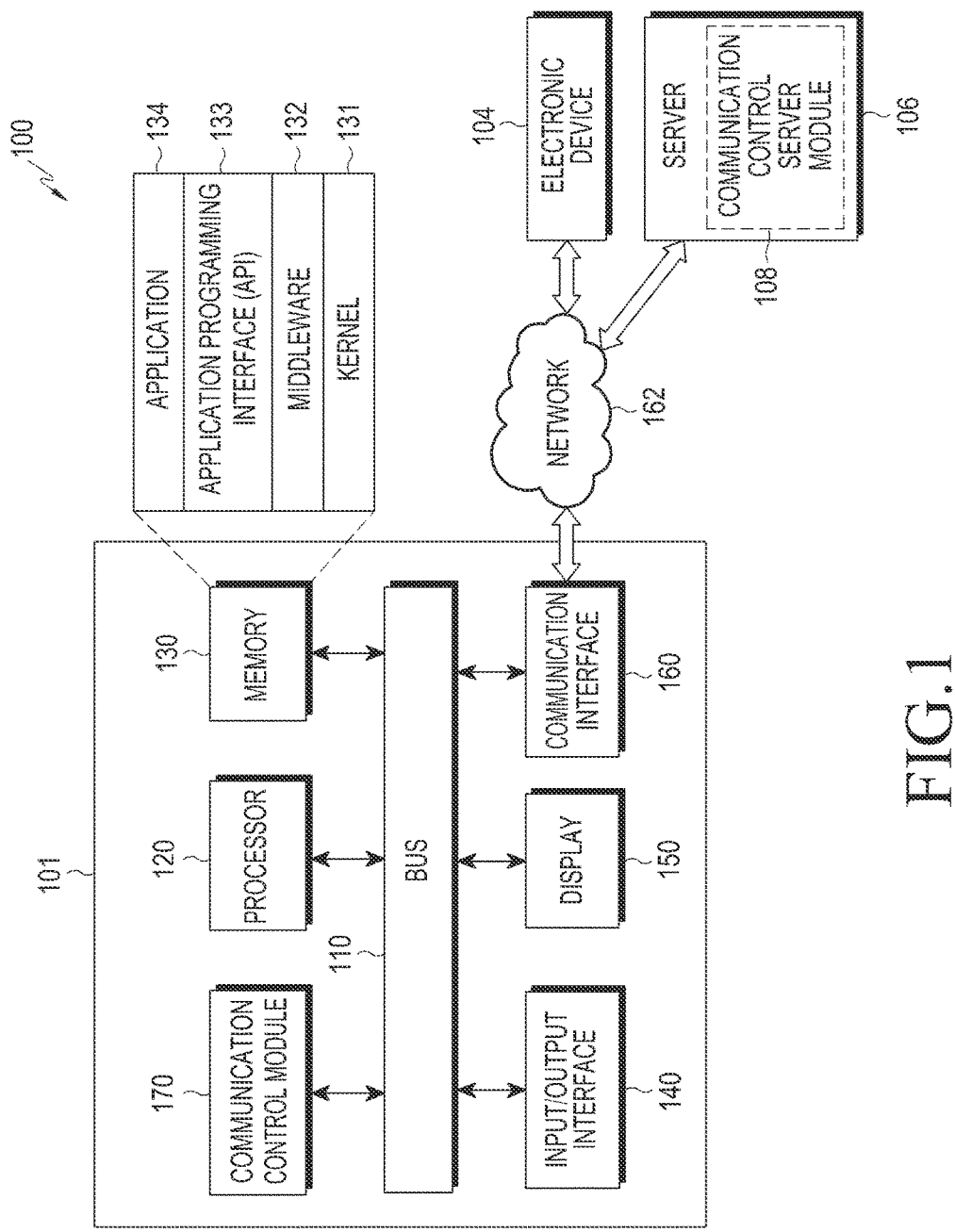
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the terms "include" or "may include," which may be used in various embodiments of the present disclosure, refer to the presence of disclosed functions, operations or elements, and do not restrict the addition of one or more functions, operations or elements. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" in various embodiments of the disclosure means the inclusion of at least one or all of the disclosed elements. For example, the expression "A or B" may include A, may include B, or may include both A and B.

The expressions such as "first," "second," or the like used in various embodiments of the present disclosure may modify various component elements in the various embodiments but may not limit corresponding component elements. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms in various embodiments of the present disclosure are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a MP3 player, a mobile medical device, a camera, and a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, a television, a digital video disk (DVD) player, an audio player, a refrigerator, an air conditioner, a cleaner, an oven, a microwave, a washing machine, an air purifier, a set-top box, a TV box (e.g., HomeSync™ of Samsung, Apple TV™, or Google TV™), a game console, an electronic dictionary, an electronic key, a camcorder, or an electronic frame.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a global positioning system (GPS) receiver, an event data recorder (EDR), a flight data recorder (FDR), a vehicle infotainment device, an electronic equipment for a ship (for example a ship navigation device and gyro-compass and/or the like, avionics, a security device, a head unit for vehicle, an industrial or household robot, an automatic teller machine (ATM) in banking facilities or a point of sale (POS) in stores.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and/or the like) including a camera function. An electronic device according to various embodiments of the present disclosure may be a combination of one or more of above described various devices. Also, an electronic device according to various embodiments of the present disclosure may be a flexible device.

Also, an electronic device according to various embodiments of the present disclosure is not limited to the above described devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIGS. 1 through 14, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and/or the like are used to differentiate between objects having the same terminology and are in no way intended to represent a chronological order, unless where explicitly stated otherwise. A set is defined as a non-empty set including at least one element.

FIG. 1 illustrates a network environment including an electronic device according to an embodiment of the present disclosure.

Referring to FIG. 1, a network environment 100 including an electronic device 101 is illustrated, where the electronic device 101 may include a bus 110, a processor 120, a memory 130, an input/output interface 140, a display 150, a communication interface 160, and a communication control module 170.

The bus 110 may be a circuit to connect the above-described components with one another and to transfer communication (for example, a control messages) among the above-described components.

For example, the processor 120 may receive an instruction, through the bus 110, from the aforementioned other components (for example, the memory 130, the input/output interface 140, the display 150, the communication interface 160, and the communication control module 170), decipher the received instruction, and perform calculation or data processing according to the deciphered instruction. The processor 120 may be called a controller.

The memory 130 may store an instruction or data received from the processor 120 or other components (for example, at least one of the input/output interface 140, the display 150, the communication interface 160 and the communication control module 170) or generated by the processor 120 or other components. The memory 130 may include programming modules, for example, a kernel 131, middleware 132, an application programming interface (API) 133, an application 134, and/or the like. The aforementioned programming modules may be formed of software, firmware, hardware, or a combination of at least two thereof.

The kernel 131 may control or manage system resources (for example, at least one of the bus 110, the processor 120, the memory 130 and/or the like) which are used for performing an operation or a function implemented by other programming modules, for example, the middleware 132, the API 133 or the application 134. Further, the kernel 131 may provide an interface through which the middleware 132, the API 133, and the application 134 may access individual components of the electronic device 101 to control or manage the same.

The middleware 132 may serve as an intermediary such that the API 133 or the application 134 communicates with the kernel 131 to transfer and receive data. Further, in relation to requests for operation received from the application 134, the middleware 132 may control (for example, schedule or load-balance) the operation requests by using, for example, a method of assigning a priority to use system resources (for example, the bus 110, the processor 120, the memory 130 and/or the like) of the electronic device 101 with respect to at least one application among the application 134.

The API 133 is an interface by which the application 134 controls a function provided from the kernel 131 or the middleware 132, and may include, for example, at least one interface or function (for example, an instruction) for at least one of file control, window control, image processing, and text control.

According to various embodiment, the application 134 may include at least one of a short message service (SMS)/ multimedia messaging service (MSS) application, an email application, a calendar application, an alarm application, a health care application (for example, application for measuring at least one of exercise amounts and blood sugar), and an environmental information application (for example, application providing information on at least one of air pressure, humidity, temperature and/or the like). Additionally or alternately, the application 134 may be an application related to the information exchange between the electronic device 101 and an external electronic device (for example, an electronic device 104). The application related to the information exchange may include, for example, a notification relay application for transferring particular information to the external electronic device or a device management application for managing the external electronic device.

For example, the notification relay application may include a function of transferring notification information created by other applications of the electronic device 101 (e.g., the SMS/MMS application, the e-mail application, the health care application, and the environment information application) to the external electronic device (e.g., the electronic device 104). Additionally or alternately, the notification relay application may, for example, receive notification information from an external electronic device (for example, the electronic device 104), and may provide the received notification information to a user.

The device management application may manage (for example, at least one of installation, deletion, or updating), for example, at least some functions (for example, turning external electronic device itself (or some component thereof) on or off, or adjusting the brightness (or resolution) of a display) of an external electronic device (for example, the electronic device 104) that communicates with the electronic device 101, applications performed in the external electronic device, or services (for example, a call service or a message service) provided in the external electronic device.

According to various embodiments, the application 134 may include an application which is designated according to the property (for example, the type of electronic device) of the external electronic device (for example, the electronic device 104). For example, when the external electronic device is an MP3 player, the application 134 may include an application related to reproduction of music. Similarly, when the external electronic device is a mobile medical appliance, the application 134 may include an application related to health care. According to an embodiment of the present disclosure, the application 134 may include at least one of an application designated for the electronic device 101 and an application received from external electronic devices (for example, a server 106, or an electronic device 104).

The input/output interface 140 may transmit an instruction or data input by the user through an input/output device (for example, at least one of a sensor, a keyboard, and a touch screen) to at least one of the processor 120, the memory 130, the communication interface 160, and the communication control module 170 through, for example, the bus 110. For example, the input/output interface 140 may provide, to the processor 120, data for a user's touch which is input through the touch screen. Further, the input/output interface 140 may output an instruction or data received through, for example, the bus 110, from the processor 120, the memory 130, the communication interface 160, and the communication control module 170 through the input/output device (for example, at least one of a speaker and a display). For example, the input/output interface 140 may output voice data processed by the processor 120 to the user through a speaker.

The display 150 may display various pieces of information (for example, at least one of multimedia data and text data) for the user.

The communication interface 160 may make a communication connection between the electronic device 101 and external electronic devices (for example, the electronic device 104 or the server 106). For example, the communication interface 160 may be connected to a network 162 through wireless or wired communication to communicate with the external electronic device. The wireless communication may include at least one of Wi-Fi, Wi-Fi Direct, Bluetooth (BT), near field communication (NFC), a global positioning system (GPS), or cellular communication (for example, LTE, LTE-A, CDMA, WCDMA, UMTS, WiBro, or GSM). The wired communication may include at least one of, for example, a universal serial bus (USB), a high definition multimedia interface (HDMI), recommended standard 232 (RS-232), and a plain old telephone service (POTS).

According to an embodiment of the present disclosure, the network 162 may be a telecommunication network. The communication network may include at least one of a computer network, the Internet, the Internet of Things, and a telephone network. According to an embodiment, a protocol (for example, a transport layer protocol, a data link layer protocol, or a physical layer protocol) for communication between the electronic device 101 and external electronic devices may be supported by at least one of the application 134, the API 133, the middleware 132, the kernel 131, and the communication interface 160.

According to an embodiment, the communication control module 170 may support driving of the electronic device 101 by performing at least one of operations (or functions) implemented by the electronic device 101. For example, the server 106 may include a communication control server module 108 capable of supporting the communication control module 170 implemented in the electronic device 101. For example, the communication control server module 108 may include at least one component of the communication control module 170, and may perform (for example, perform as a proxy) at least one of the operations performed by the communication control module 170.

The communication control module 170 may process at least a part of information obtained from other components (for example, at least one of the processor 120, the memory 130, the input/output interface 140, and the communication interface 160) and utilize the processed information in various manners. For example, the communication control module 170 may control at least some functions of the electronic device 101 by using the processor 120 or independently of the processor 120 so that the electronic device 101 may interwork with other electronic devices (for example, the electronic device 104 or the server 106). The communication control module 170 may be integrated into the processor 120 or the communication interface 160. According to an embodiment, at least one component of the communication control module 170 may be included in the server 106 (for example, the communication control server module 108) and receive at least one operation, which is performed by the communication control module 170, from the server 106. Additional information on the communication control module 170 is provided through FIG. 2 described below.

Figure 2:
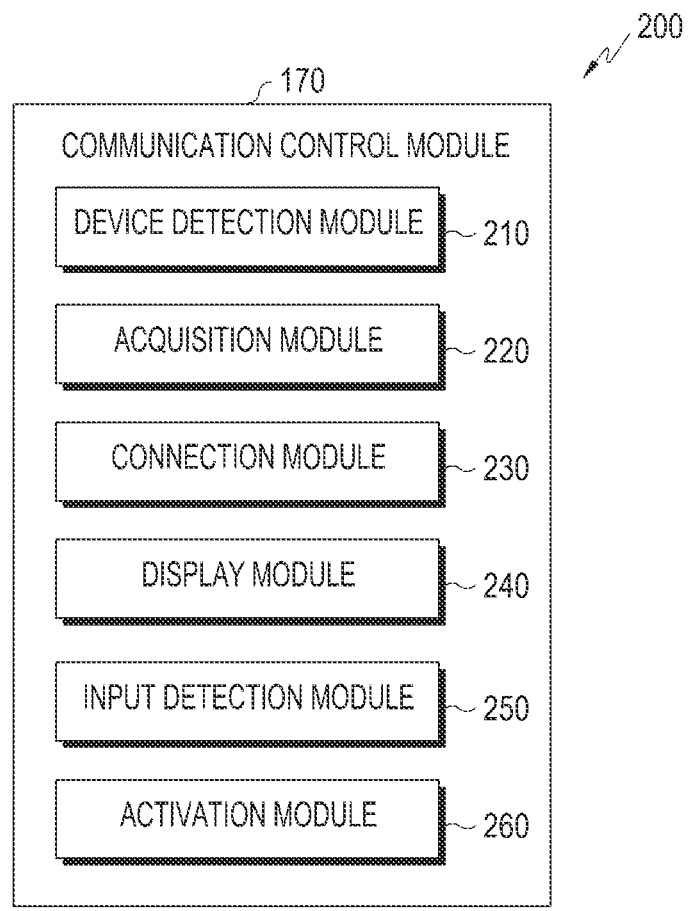
FIG. 2 is a block diagram illustrating a communication control module of an electronic device according to an embodiment of the present disclosure.

FIG. 2 is a block diagram illustrating a communication control module of an electronic device according to an embodiment of the present disclosure.

Referring to FIG. 2, a block diagram 200 including a communication control module 170 is illustrated, where the communication control module 170 may include a device detection module 210, an acquisition module 220, a connection module 230, a display module 240, an input detection module 250, and an activation module 260. The communication control module 170 may be provided separately from a processor (e.g., the processor 120 as illustrated in FIG. 1), or the entirety or a part thereof may be integrated into the processor.

The device detection module 210 according to various embodiments of the present disclosure can detect (or discover) at least one peripheral device (or, referred to as a peripheral electronic device or a neighbor electronic device) which supports a corresponding communication type, through a corresponding communication module of the electronic device which supports the corresponding communication type. For example, the device detection module 210 can detect a first peripheral device (e.g., a television) which supports a first communication type, through a first communication module (e.g., a Bluetooth module, and/or the like) of an electronic device which supports the first communication type. For example, the device detection module 210 can detect a second peripheral device (e.g., a gateway, a router, a hub device, an access point (AP), and/or the like) which supports a second communication type, through a second communication module (e.g., a Wi-Fi module, and/or the like) of an electronic device which supports the second communication type. For example, the device detection module 210 can detect a third peripheral device (e.g., a temperature sensor, and/or the like) which supports a third communication type, through a third communication module (e.g., a Zigbee module, and/or the like) of an electronic device which supports the third communication type. For example, the device detection module 210 can detect a fourth peripheral device (e.g., a weight sensor, and/or the like) which supports a fourth communication type, through a fourth communication module (e.g., an NFC module, and/or the like) of an electronic device which supports the fourth communication type. For example, the device detection module 210 can detect a fifth peripheral device (e.g., a watch, a gear, a glass, and/or the like) which supports the first communication type, through the first communication module.

In an embodiment, the device detection module 210 can search for at least one peripheral device, which is located within a communicable distance (or a maximum communication distance) of the first communication module and supports the first communication type, through the first communication module, and can identify, as the first peripheral device, a peripheral device having first identification information included in the pre-stored group information from among the searched at least one peripheral device.

In an embodiment, the device detection module 210 can periodically activate the first communication module through the activation module 260, search for at least one peripheral device, which is located within the communicable distance of the first communication module and supports the first communication type, through the activated first communication module, and identify, as the first peripheral device, a peripheral device having the first identification information from among the searched at least one peripheral device. The activation of the communication module may imply at least one of powering-on (or turning-on) of the communication module, releasing of a restraint of a transmission function, releasing of a restraint of a reception function, and changing of a search period (e.g., change to a first mode, a search period of which is more rapid than that of a basic mode, change from a second mode, a search period of which is slower than that of the basic mode, to the basic mode or the first mode, and/or the like). Further, the deactivation of the communication module may imply at least one of powering-off (or turning-off) of the communication module, restraining of a transmission function (e.g., blocking of the transmission function, transmission allowance according to a predetermined period/condition, and/or the like), restraining of a reception function (e.g., blocking of the reception function, reception allowance according to a predetermined period/condition, and/or the like), and changing of a search period (e.g., changing from the basic mode to the second mode, and/or the like).

In an embodiment, the device detection module 210 can determine a place (e.g., the indoors such as an interior of a house, an interior of an automobile, an interior of a building, and/or the like, the outdoors such as an exterior of a house, the outside, and/or the like) where the first peripheral device is located, based on device identification/type information or device arrangement place information, which is included in the group information, and change the search period (or a discovery period) for a peripheral device through the first communication module according to the determined place. For example, the device detection module 210 can change the search period to be more rapid or slower than a basic search period (or a default search period) according to a predetermined basic mode.

For example, when a place where the first peripheral device is located is the indoors, the device detection module 210 can operate in a first mode in which a peripheral device is searched for in a state in which the search period is changed to be more rapid (or, in contrast, slower) than the predetermined basic search period (or the default search period). For example, when a place where the first peripheral device is located is the outdoors, the device detection module 210 can operate in a second mode in which a peripheral device is searched for in a state in which the search period is changed to be slower (or, in contrast, more rapid) than the predetermined basic search period (or the default search period).

In an embodiment, the device detection module 210 can search for at least one peripheral device, which is located within a communicable distance (or a maximum communication distance) of the second communication module and supports the second communication type, through the second communication module, and can identify, as the second peripheral device, a peripheral device having second identification information included in the group information from among the searched at least one peripheral device.

In an embodiment, the device detection module 210 can search for at least one peripheral device, which is located within the communicable distance of the second communication module and supports the second communication type, through the second communication module, and can identify, as the second peripheral device, a peripheral device having second device type information included in the group information from among the searched at least one peripheral device when a peripheral device having the second identification information does not exist from among the searched at least one peripheral device.

In an embodiment, the device detection module 210 can activate the second communication module through the activation module 260 and search for at least one peripheral device, which is located within the communicable distance of the second communication module and supports the second communication type, through the activated second communication module.

In an embodiment, the device detection module 210 can change a first search period for searching for a peripheral device through the second communication module, to a second search period which is shorter than the first search period, and search for at least one peripheral device, which is located within the communicable distance of the second communication module and supports the second communication type, according to the second search period through the second communication module.

In an embodiment, the device detection module 210 can determine a place (e.g., the indoors such as the interior of a house, the interior of an automobile, the interior of a building, and/or the like, the outdoors such as the exterior of a house, the outside, and/or the like) where the second peripheral device is located, based on the device identification/type information or the device arrangement place information, which is included in the group information, and change the search period (or a discovery period) for a peripheral device through the second communication module according to the determined place. For example, the device detection module 210 can change the search period to be more rapid or slower than a predetermined basic search period (or a default search period).

For example, when a place where the second peripheral device is located is the indoors, the device detection module 210 can operate in a first mode in which a peripheral device is searched for in a state in which the search period is changed to be more rapid (or, in contrast, slower) than the predetermined basic search period (or the default search period). For example, when a place where the second peripheral device is located is the outdoors, the device detection module 210 can operate in a second mode in which a peripheral device is searched for in a state in which the search period is changed to be slower (or, in contrast, more rapid) than the predetermined basic search period (or the default search period).

The acquisition module 220 according to various embodiments of the present disclosure can acquire group information on a group of peripheral devices to which the first peripheral device belongs, based on the first identification information of the first peripheral device. In an embodiment, the acquisition module 220 can acquire the group information from a memory (e.g., the memory 130 illustrated in FIG. 1) of the electronic device. The group information may be stored in the memory as a database. For example, the database may store a plurality of pieces of group information, and each piece of the group information may indicate information on a group of peripheral devices.

For example, each piece of the group information may include identification (ID) information (e.g., an account, a device name, an inherent ID, a network address, an MAC address, a SIM card ID, a phone number, a serial number, a Bluetooth address, a Wi-Fi address, a Zigbee address, an NFC address, and/or the like), device type information (e.g., a device name, a device type/kind, usage/function/service, and/or the like), connection information (e.g., an ID, a password, a phone number, a communication type/scheme/procedure (or a communication connection type/scheme/procedure), communication module identification information, data format information, allocation information of a communication resource (or a network resource), synchronization information, a communication device name, a network address, an IP address, an MAC address, a Bluetooth address, a Wi-Fi address, a Zigbee address, an NFC address, and/or the like), and/or the like of at least one peripheral device belonging to the corresponding group.

In an embodiment, the acquiring of the group information may automatically start after detecting a peripheral device, which is identified by the device type information and of which the location is fixed, from among peripheral devices belonging to the corresponding group. For example, the acquisition module 220 may not start the acquiring of the group information when the detected peripheral device is a device (e.g., a wearable device such as a watch, and glasses, and/or the like, or a portable/mobile device such as a biometric sensor (e.g., a weight sensor, a pulse sensor, a body temperature sensor, and/or the like)), the location of which is not fixed. The peripheral device which is an acquisition start condition of the group information may be configured as a standard peripheral device, and an identifier of the standard peripheral device may be included in the group information. In an embodiment, a peripheral device, which supports a communication type having a relatively high frequency of use, is common to a plurality of groups, or supports a communication type of a wearable/portable/mobile device, from among peripheral devices, the location of which is fixed, may be configured as the standard peripheral device.

In an embodiment, the acquiring of the group information may automatically start after detecting and/or establishing communication connection with the standard peripheral device. For example, the acquisition module 220 may automatically start the acquiring of the group information before the communication connection is established after the standard peripheral device is detected or automatically start the acquiring of the group information after the standard peripheral device is detected and the communication connection is established.

In an embodiment, the acquisition module 220 can acquire the group information from the first peripheral device, another peripheral device, or a server (e.g., the server 106 as illustrated in FIG. 1, and/or the like).

The connection module 230 according to various embodiments of the present disclosure can establish a communication connection (or pairing) with a peripheral device through a corresponding communication module. The communication connection may include a session connection using a session ID, a communication channel connection using a communication channel ID, and/or the like. In a communication connection process, authentication/identification of a counterpart device, configuration/notification or reception (or negotiation) of a communication ID, configuration/notification or reception (or negotiation) of a communication scheme/procedure and/or a data format, allocation/notification or reception (or negotiation) of a communication resource (or a network resource), synchronization, and/or the like can be performed. Further, after the communication connection, communication of data (or contents) can be performed according to a communication scheme/procedure/format configured in the communication connection process.

Furthermore, repeated communication connection operations may not be required during the communication of data. For example, the connection module 230 can establish a first communication connection with the first peripheral device through the first communication module. For example, the connection module 230 can establish a second communication connection with the second peripheral device through the second communication module. For example, the connection module 230 can establish a third communication connection with the third peripheral device through the third communication module.

In an embodiment, the acquiring of the group information by the acquisition module 220 may start by the establishing of the first communication connection or the detecting of the first peripheral device.

The display module 240 according to various embodiments of the present disclosure can display a search/connection state (or IDs) of peripheral devices within the group through a display (e.g., the display 150 as illustrated in FIG. 1, and/or the like) of the electronic device or a display of the peripheral device. Some peripheral devices within the group may be limited to a specific electronic device by the identification information or may be limited to a specific kind/type of electronic device by the device type information. For example, one peripheral device within the group may be limited to one electronic device having a specific device ID. For example, one peripheral device within the group may be limited to a specific kind/type of electronic device such as a printer, a television, a sensor, a headset, and/or the like.

The input detection module 250 according to various embodiments of the present disclosure can detect a user's input for the electronic device. The input detection module 250 can detect a user input through at least one of a communication device (e.g., the communication interface 160 as illustrated in FIG. 1, the input/output interface 140 as illustrated in FIG. 1, and/or the like), an input device (e.g., the input/output interface 140, the display 150, and/or the like), a sensor module, a camera module, and/or the like. In an embodiment, the input detection module 250 can detect selection for at least one of the peripheral devices within the group.

In an embodiment, the display module 240 can display a search/connection state (or IDs) of the peripheral devices within the group, the input detection module 250 can detect selection for at least one of the peripheral devices (or at least one of the IDs) within the group, and the connection module 230 can establish a communication connection with at least one of the peripheral devices within the group according to the selection.

In order to detect the peripheral devices within the group through the device detection module 250 as the group information is acquired, the activation module 260 according to various embodiments of the present disclosure can activate the corresponding communication modules of the electronic device. In an embodiment, the activation module 260 can deactivate communication modules of the electronic device, which do not correspond to the peripheral devices within the group. For example, when activating the first to third communication modules corresponding to all of the peripheral devices within the group according to the group information, the activation module 260 can deactivate the fourth communication module in order to reduce power consumption.

In an embodiment, the connection module 230 can establish communication connections with the first and second peripheral devices, and the activation module 260 can deactivate the third communication module based on the group information.

In an embodiment, the connection module 230 can establish a first communication connection with the first peripheral device through the first communication module, and the connection module 230 can establish a second communication connection with the second peripheral device through the second communication module. Further, the connection module 230 can detect a release of the first communication connection after the establishment of the first and second communication connections, and the connection module 230 can automatically release the second communication connection according to the release of the first communication connection.

In an embodiment, the connection module 230 can establish the first communication connection with the first peripheral device through the first communication module, and the connection module 230 can establish the second communication connection with the second peripheral device through the second communication module. Further, the connection module 230 can detect a release of the first communication connection after the establishment of the first and second communication connections, and the activation module 260 can automatically deactivate the second communication module according to the release of the first communication connection.

In an embodiment, the connection module 230 can detect a release of the communication connections with all of the peripheral devices within the group after the establishment of the communication connections with all of the peripheral devices within the group, and the activation module 260 can deactivate some communication modules corresponding to some peripheral devices within the group according to the release of the communication connections.

In an embodiment, the activation module 260 can deactivate communication modules of the electronic device, which correspond to all of the peripheral devices within the group, when communication connections with all of the peripheral devices within the group are released.

In an embodiment, when communication connections with all of the peripheral devices within the group are released, the activation module 260 can deactivate communication modules of the electronic device except for a communication module communication-connected to a peripheral device not belonging to the group, which correspond to some of the peripheral devices within the group.

In an embodiment, when communication connections with all of the peripheral devices within the group are released, the activation module 260 can deactivate communication modules of the electronic device, which correspond to all of the peripheral devices within the group except for the standard peripheral device. For example, the standard peripheral device may be automatically selected based on the group information or may be selected by a user.

Figure 3:
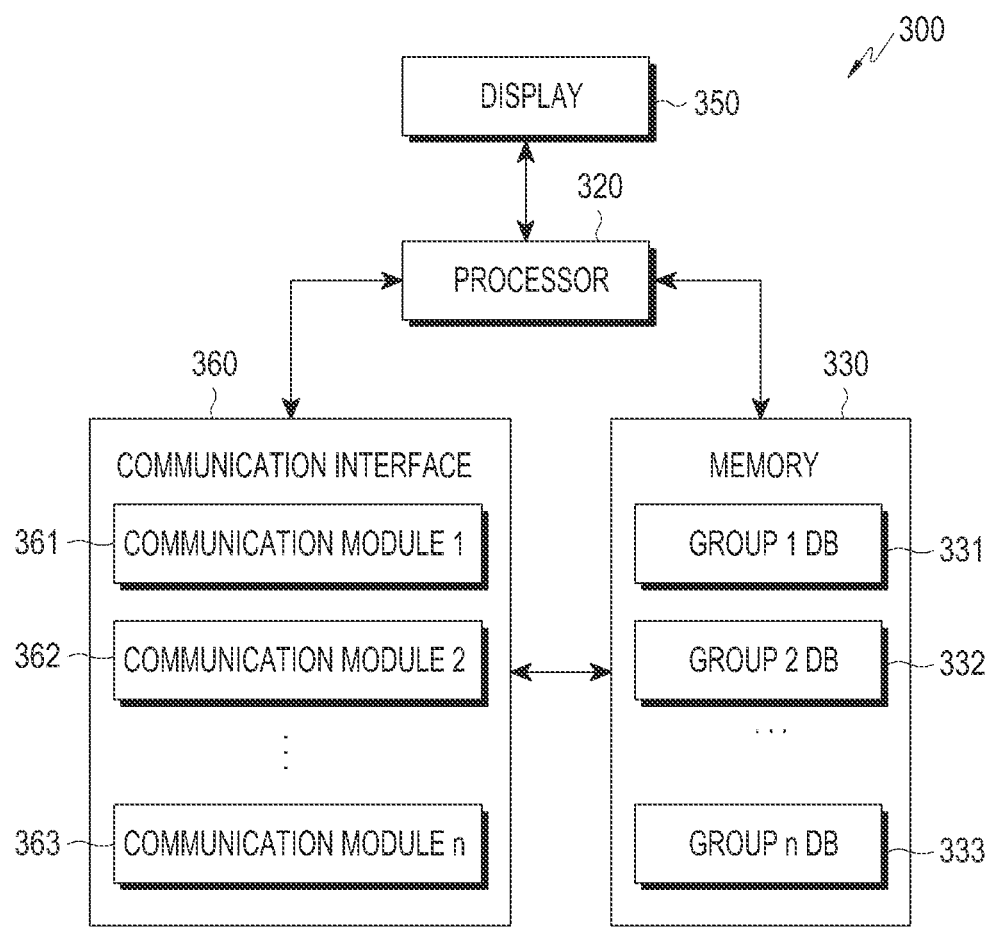
FIG. 3 is a view for describing a communication control system according to an embodiment of the present disclosure.

FIG. 3 is a view for describing a communication control system according to an embodiment of the present disclosure.

Referring to FIG. 3, a communication control system 300 is illustrated, where the communication control system 300 may include a communication interface 360 (e.g., the communication interface 160 of FIG. 1), a memory 330 (e.g., the memory 130 of FIG. 1), a display 350 (e.g., the display 150 of FIG. 1), and a processor 320 (e.g., the processor 120 of FIG. 1).

The communication interface 360 can establish a communication connection between an electronic device (e.g., the electronic device 101 of FIG. 1) and a peripheral device. For example, the communication interface 360 may be connected to a network (e.g., the network 162 of FIG. 1) through wireless communication or wired communication to communicate with the peripheral device. The communication interface 360 can transmit data received from the processor 320 or stored in the memory 330, to the peripheral device. The communication interface 360 can transmit the data received from the peripheral device to the processor 320, or can store the data in the memory 330. The communication interface 360 may include first to $n^{th}$ communication modules 361, 362, and 363 which support different communication types.

The memory 330 can store at least one piece of group information indicating information on a group of peripheral devices. For example, the memory 330 can store first to $n^{th}$ group databases (DBs) 331, 332, and 333 corresponding to different groups of peripheral devices. For example, each piece of the group information may include identification information (e.g., an account, a device name, an inherent ID, a network address, an MAC address, a SIM card ID, a phone number, a serial number, a Bluetooth address, a Wi-Fi address, a Zigbee address, an NFC address, and/or the like), device type information (e.g., a device name, a device type/kind, usage/function/service, an identifier of the standard peripheral device, and/or the like), connection information (e.g., an ID, a password, a phone number, a communication type/scheme/procedure (or a communication connection type/scheme/procedure), communication module identification information, data format information, allocation information of a communication resource (or a network resource), synchronization information, a communication device name, a network address, an IP address, a MAC address, a Bluetooth address, a Wi-Fi address, a Zigbee address, an NFC address, and/or the like), and/or the like of at least one peripheral device belonging to the corresponding group.

The display 350 can display search/connection states (or IDs) of the peripheral devices of the group. The display 350 can display at least a part of group information generated by the processor 320, or can display at least a part of group information stored in the memory 330. In an embodiment, the display 350 can display a list screen including a plurality of items corresponding to the peripheral devices belonging to the group, in order to store/change/update the group information.

The processor 320 can generate group information on a group including a plurality of peripheral devices in which communication connections with the electronic device are established. The processor 320 can store the generated group information in the memory 330 as a database. The processor 320 can detect a first peripheral device within the group through the communication interface 360 based on the stored group information. The processor 320 can automatically search for other peripheral devices within the group according to a detection of the first peripheral device, and control the communication interface 360 to establish a communication connection with the searched at least one peripheral device.

Figure 4:
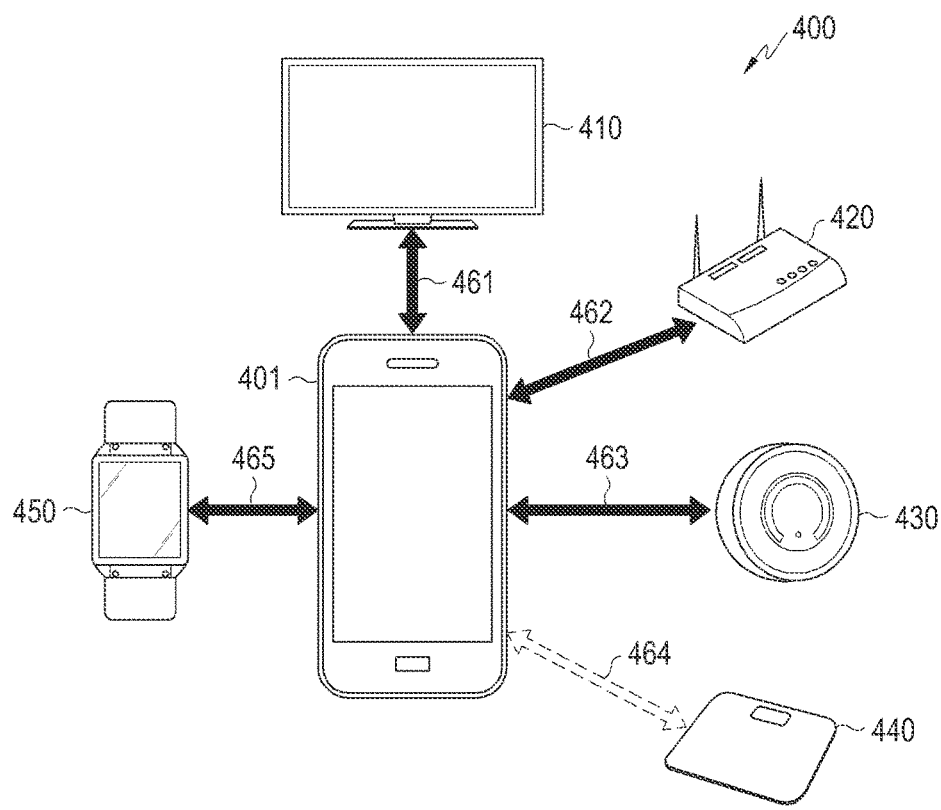
FIG. 4 illustrates a network environment according to an embodiment of the present disclosure.

FIG. 4 illustrates a network environment according to an embodiment of the present disclosure.

Referring to FIG. 4, a network environment 400 is illustrated, where the network environment 400 includes an electronic device 401 (e.g., the electronic device 101 of FIG. 1), a first peripheral device 410 (e.g., a television), a second peripheral device 420 (e.g., an access point), a third peripheral device 430 (e.g., a temperature sensor), a fourth peripheral device 440 (e.g., a weight sensor), and a fifth peripheral device 450 (e.g., a wearable device such as a watch) which are connectable to the electronic device 401.

The electronic device 401 can include a first communication module which supports a first communication type (e.g., Bluetooth communication), and establish a first communication connection 461 with the first peripheral device 410 through the first communication module.

The electronic device 401 can include a second communication module which supports a second communication type (e.g., Wi-Fi communication), and establish a second communication connection 462 with the second peripheral device 420 through the second communication module.

The electronic device 401 can include a third communication module which supports a third communication type (e.g., Zigbee communication), and establish a third communication connection 463 with the third peripheral device 430 through the third communication module.

The electronic device 401 can include a fourth communication module which supports a fourth communication type (e.g., NFC communication), and establish a fourth communication connection 464 with the fourth peripheral device 440 through the fourth communication module.

The electronic device 401 can establish a fifth communication connection 465 with the fifth peripheral device 450 through the first communication module.

The electronic device 401 can generate group information on a group including a plurality of peripheral devices when establishing a communication connection with the plurality of peripheral devices through a plurality of communication modules. The generation of the group information can start by a condition in which the group includes at least one standard peripheral device of which the location identified by the device type information is fixed. For example, when the electronic device 401 establishes communication connections with the first, second, third, and fifth peripheral devices 410, 420, 430, and 450 except for the fourth peripheral device 440, the electronic device 401 can generate group information on a group including the first, second, third, and fifth peripheral devices 410, 420, 430, and 450. The electronic device 401 can store the group information in the memory (e.g., the memory 130 of FIG. 1) of the electronic device 401 as a database. In an embodiment, the electronic device 401 can store the group information in an external device such as a server. In an embodiment, the electronic device 401 can store the group information in at least one of the peripheral devices.

Figure 5:
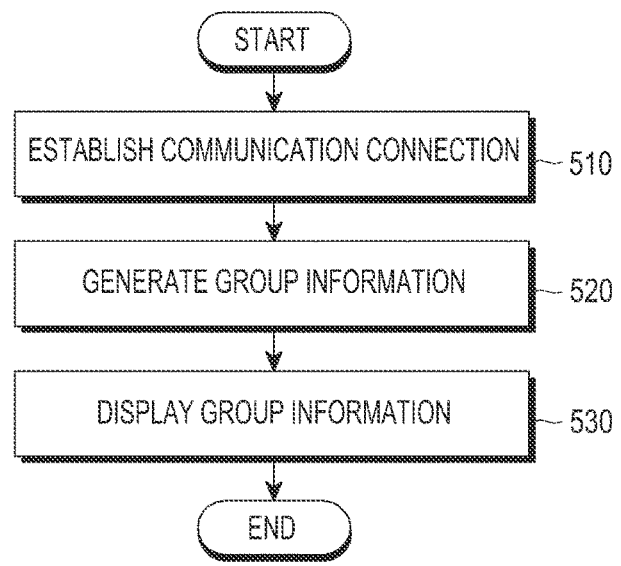
FIG. 5 is a flowchart illustrating a method of generating group information according to an embodiment of the present disclosure.

FIG. 5 is a flowchart illustrating a method of generating group information according to an embodiment of the present disclosure.

Figure 6:
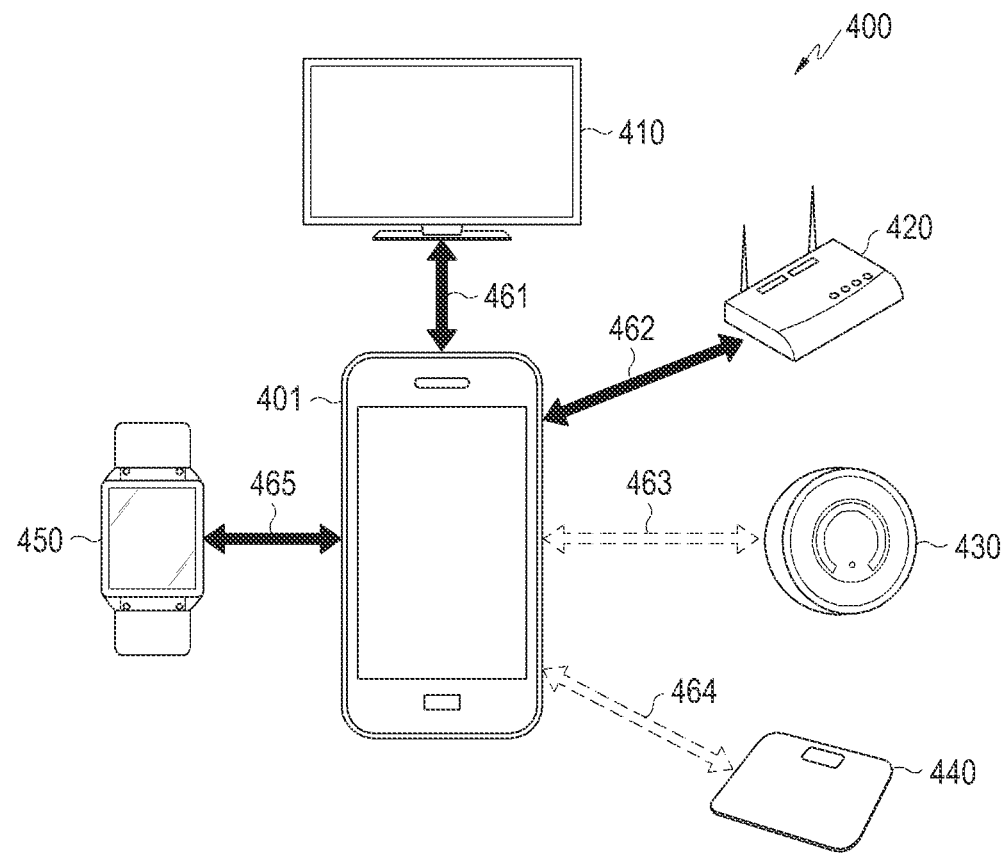
FIGS. 6, 7A, and 7B are views describing a method of generating group information according to various embodiments of the present disclosure.
Figure 7A:
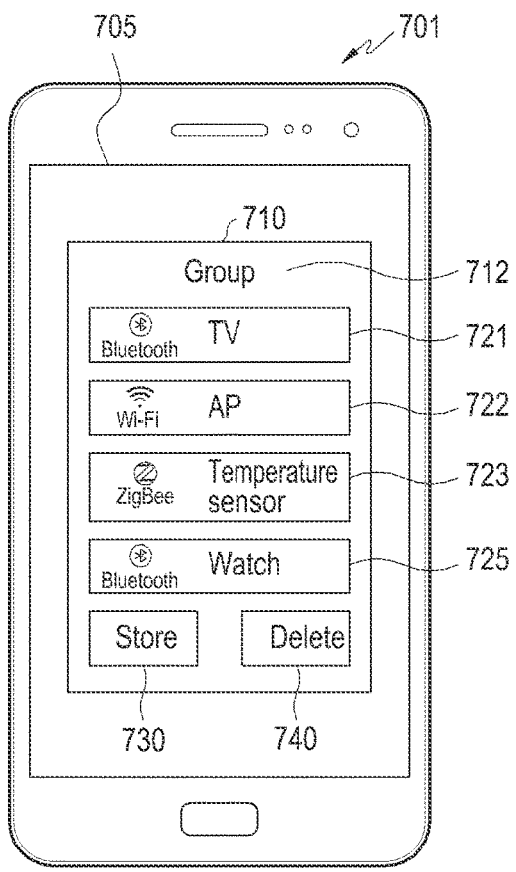
Figure 7B:
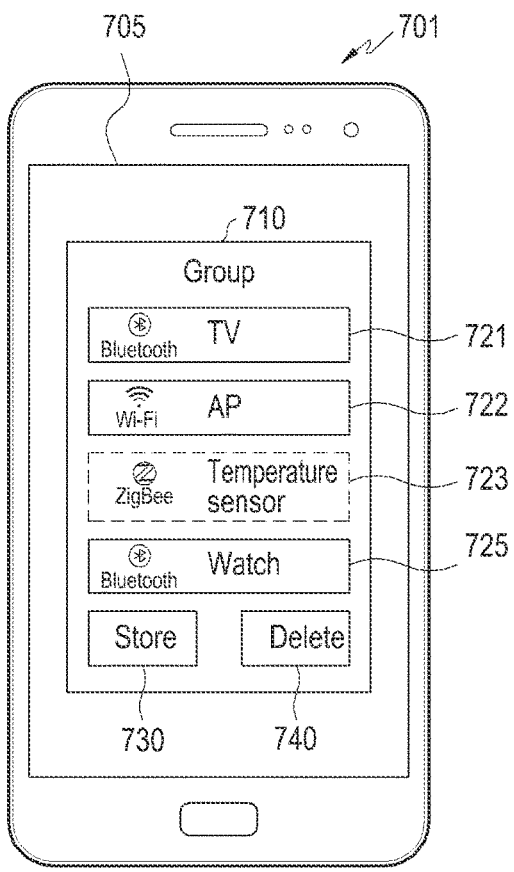

FIGS. 6, 7A and 7B are views describing a method of generating group information according to various embodiments of the present disclosure.

Referring to FIG. 5, a flowchart is illustrated, such that in operation 510, an electronic device (e.g., the electronic device 101 of FIG. 1) can establish a communication connection with a plurality of peripheral devices through a plurality of communication modules. Each of the plurality of communication modules can be activated by a user input, an environment configuration (or settings of the electronic device), generation of an event, and/or the like. The activation of the communication module may imply at least one of powering-on (or turning-on) of the communication module, releasing of a restraint of a transmission function, releasing of a restraint of a reception function, and changing of a search period (e.g., change to a first mode, a search period of which is shorter than that of a basic mode, change from a second mode, a search period of which is longer than that of the basic mode, to the basic mode or the first mode, and/or the like). Further, the deactivation of the communication module may imply at least one of powering-off (or turning-off) of the communication module, restraining of a transmission function (e.g., blocking of the transmission function, transmission allowance according to a predetermined period/condition, and/or the like), restraining of a reception function (e.g., blocking of the reception function, reception allowance according to a predetermined period/condition, and/or the like), and changing of a search period (e.g., change from the basic mode to the second mode, and/or the like).

The electronic device can search for at least one peripheral device, which is located within a communicable distance (or a maximum communication distance) of each of the communication modules and supports a corresponding communication type, through each of the plurality of communication modules. In an embodiment, the electronic device can automatically establish a communication connection with the searched at least one peripheral device according to an environment configuration for each of the communication modules.

In an embodiment, the electronic device can display a list of at least one peripheral device searched with respect to each of the communication modules on a display (e.g., the display 150 of FIG. 1) of the electronic device or a display of a peripheral device (e.g., a wearable device), detect a user's selection (or a user input) for the at least one peripheral device in the list, and establish a communication connection with the selected at least one peripheral device. The communication connection may include session connection using a session ID, communication channel connection using a communication channel ID, and/or the like. In a communication connection process, the electronic device can perform authentication/identification of a counterpart device, configuration/notification or reception (negotiation) of a communication ID, configuration/notification or reception (or negotiation) of a communication scheme/procedure and/or a data format, allocation/notification or reception (or negotiation) of a communication resource (or a network resource), synchronization, and/or the like. After the communication connection, the electronic device can perform communication of data (or contents) according to a communication scheme/procedure/format configured in the communication connection process, and repeated communication connection operations may not be required during such communication of data.

Referring to FIG. 6, a network environment 400 is illustrated, where the network environment 400 includes an electronic device 401 (e.g., the electronic device 101 of FIG. 1), a first peripheral device 410 (e.g., a television), a second peripheral device 420 (e.g., an access point), a third peripheral device 430 (e.g., a temperature sensor), a fourth peripheral device 440 (e.g., a weight sensor), and a fifth peripheral device 450 (e.g., a wearable device such as a watch) which are connectable to the electronic device 401.

Further, referring to FIG. 6, the electronic device 401 can establish a fifth communication connection 465 with the fifth peripheral device 450 (e.g., a wearable device such as a watch, and/or the like) through a first communication module which supports a first communication type (e.g., Bluetooth communication), establish a first communication connection 461 with the first peripheral device 410 (e.g., a television) through the first communication module, and establish a second communication connection 462 with the second peripheral device 420 (e.g., an access point) through a second communication module which supports a second communication type (e.g., Wi-Fi communication).

Turning back to FIG. 5, the flowchart is illustrated, such that in operation 520, the electronic device can generate group information on a group including a plurality of peripheral devices in which communication connections are established. The generation of the group information can start by a condition in which the group includes at least one standard peripheral device of which the location identified by the device type information is fixed. In an embodiment, the electronic device can store the group information in the memory (e.g., the memory 130 of FIG. 1) of the electronic device as a database. In an embodiment, the electronic device can store the group information in an external device such as a server. In an embodiment, the electronic device can store the group information in at least one of the peripheral devices.

In an embodiment, the database may have a form as in Table 1.

TABLE 1

| Group identification information | Device identification information | Device type information | Connection information |
|---|---|---|---|
| A11 | B11 | C11 | D11 |
| A11 | B12 | C12 | D12 |
| A11 | B13 | C13 | D13 |
| A11 | B15 | C15 | D15 |
| A12 | B11 | C11 | D11 |
| A12 | B14 | C14 | D14 |
| ... | ... | ... | ... |

In Table 1, each piece of group information may include at least one of group identification information, device identification information, device type information, connection information, and/or the like.

The group identification information (e.g., A11, A12, . . . ) may indicate information (e.g., a group name, a group ID, and/or the like) for identifying a corresponding group from among a plurality of groups which may be stored in the electronic device.

The device identification information (e.g., B11, B12, . . . ) may indicate information (e.g., an account, a device name, a unique ID, a network address, a MAC address, a SIM card ID, a phone number, a serial number, a Bluetooth address, a Wi-Fi address, a Zigbee address, an NFC address, and/or the like) for identifying at least one peripheral device belonging to the corresponding group.

The device type information (e.g., C11, C12, . . . ) may indicate information (e.g., a device name, a device type/kind, usage/function/service, an arrangement place (e.g., the indoors such as the interior of a house, the interior of an automobile, the interior of a building, and/or the like, the outdoors, the exterior of a house, the outside, and/or the like), and/or the like) for identifying kind/type/usage/function/service/arrangement place of at least one peripheral device belonging to the corresponding group, and the device type information may include an identifier for identifying a standard peripheral device.

The connection information (e.g., D11, D12, . . . ) may indicate information (e.g., an ID, a password, a phone number, a communication type/scheme/procedure (or communication connection type/scheme/procedure), communication module identification information, data format information, allocation information of a communication resource (or a network resource), synchronization information, a communication device name, a network address, an IP address, a MAC address, a Bluetooth address, and/or the like) for communication connection with at least one peripheral device belonging to the corresponding group.

In an embodiment, the electronic device can automatically start a generation of the group information after a plurality of communication connections having different communication types are established. In an embodiment, the electronic device can automatically start generation of the group information after a plurality of communication connections having different communication types are established and one communication connection from among the plurality of communication connections is then released.

Turning back to FIG. 6, for example, the electronic device 401 can generate group information on a group including the first peripheral device 410, the second peripheral device 420, and the fifth peripheral device 450 as the first, second, and fifth communication connections 461, 462, and 465 of the first and second communication types are established.

For example, the electronic device 401 can generate group information on a group including the first peripheral device 410, the second peripheral device 420, the third peripheral device 430, and the fifth peripheral device 450 when the first, second, third, and fifth communication connections 461, 462, 463, and 465 of the first, second, and third communication types are established as illustrated in FIG. 4, and the third communication connection 463 of the third communication type is then released as illustrated in FIG. 6. Similar to FIG. 4, the electronic device 401 can include a fourth communication module which supports a fourth communication type (e.g., NFC communication), and establish a fourth communication connection 464 with the fourth peripheral device 440 through the fourth communication module.

For example, the electronic device 401 can generate group information on a group including the first peripheral device 410, the second peripheral device 420, and the fifth peripheral device 450 as the first, second, and fifth communication connections 461, 462, and 465 of the first and second communication types are established as illustrated in FIG. 6, and then update the group information by adding information on the third peripheral device 430 to the generated group information when the third communication connection 463 of the third communication type is additionally established as illustrated in FIG. 4.

Turning back to FIG. 5, in operation 530, the electronic device can display at least a part of the generated group information.

In an embodiment, the electronic device can display at least a part of the group information through a display (e.g., the display 150 of FIG. 1, and/or the like) of the electronic device.

In an embodiment, the electronic device can transmit the at least a part of the group information to at least one of the peripheral devices, and display the at least a part of the group information through the at least one peripheral device.

In an embodiment, the electronic device can display at least a part of the group information through the display (e.g., the display 150) of the electronic device, detect user's selection for the displayed group information, and store the group information, delete the group information, remove at least one peripheral device included in the group information, or add at least one peripheral device to the group information according the user's selection.

Referring to FIG. 7A, an electronic device 701 is illustrated, where the electronic device 701 may provide a first list screen 710 indicating at least a part of group information that may be displayed on a display 705 of the electronic device 701. The first list screen 710 may include a plurality of selectable items corresponding to peripheral devices belonging to a corresponding group. For example, the first list screen 710 may include a first item 721 corresponding to a first peripheral device, a second item 722 corresponding to a second peripheral device, a third item 723 corresponding to a third peripheral device, a fifth item 725 corresponding to a fifth peripheral device, a storage button 730 (or an identification button) for storing group information, and a delete button 740 (a cancel button) for deleting the group information. Each of the displayed items may include at least one of device identification information, device type information, connection information, and/or the like.

For example, a user can select a group name 712, which is group identification information, from the first list screen 710, and change the group name 712 by inputting a text. For example, a user can store the group information by selecting a storage button 730. For example, a user can delete the group information by selecting a delete button 740. Each of the items may be provided in a form of a selectable button, and each of the items may include a text, an image, an icon, and/or the like, for indicating a device type, a communication type, and/or the like. For example, when a user selects the storage button 730, the electronic device 701 can store group information on a group including first, second, third, and fifth peripheral devices.

Referring to FIG. 7B an electronic device 701 is illustrated. The electronic device 701 of FIG. 7B is similar to the electronic device 701 of FIG. 7A, such that redundant descriptions thereof are not included below. As illustrated in FIG. 7B, for example, a user can delete information on the third peripheral device from the group information by selecting (or touching) the third item 723. For example, when a user selects the storage button 730 after the information on the third peripheral device is selected or deleted, the electronic device 701 can store group information on a group including first, second, and fifth peripheral devices.

Figure 8:
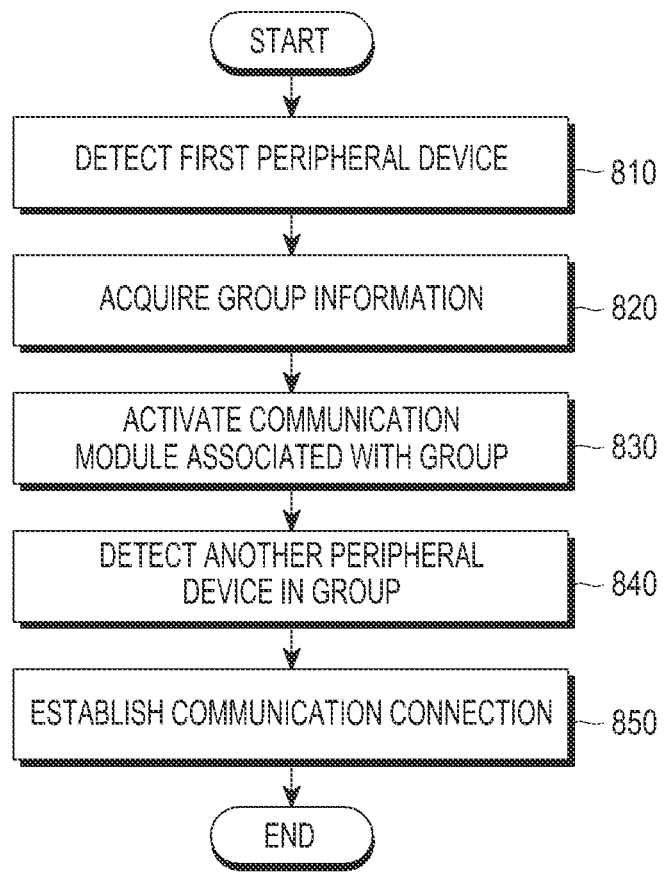
FIG. 8 is a flowchart illustrating a communication control method according to an embodiment of the present disclosure.

FIG. 8 is a flowchart illustrating a communication control method according to an embodiment of the present disclosure.

Figure 9:
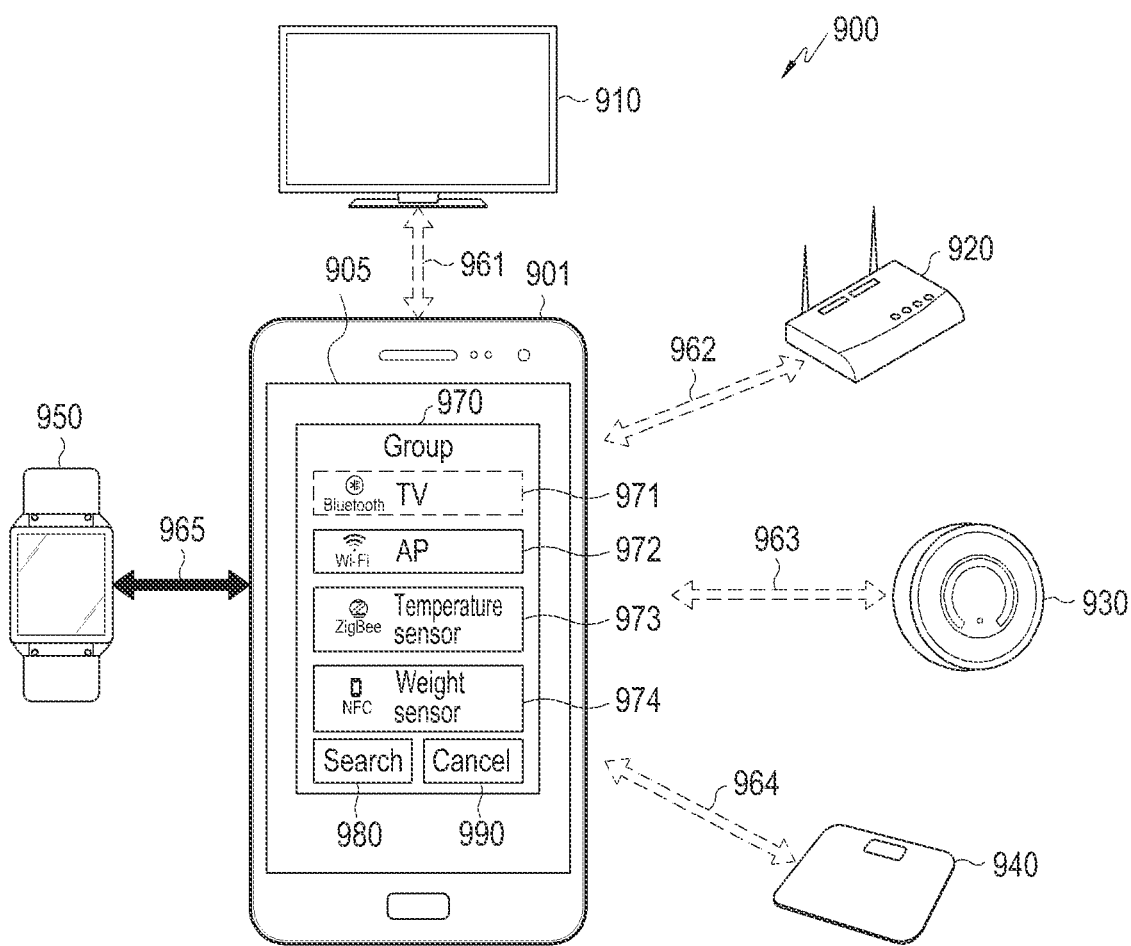
FIGS. 9 and 10 are views describing a communication control method according to various embodiments of the present disclosure.
Figure 10:
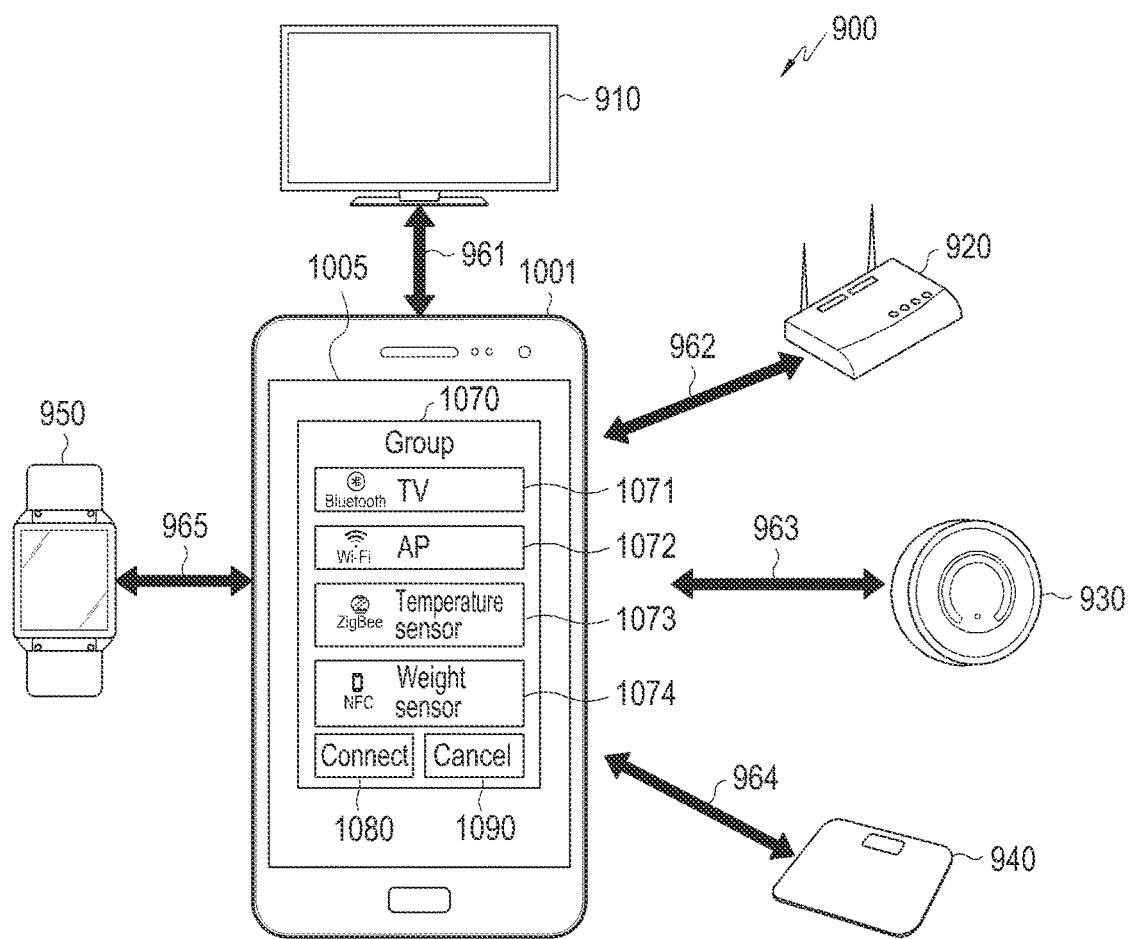

FIGS. 9 and 10 are views describing a communication control method according to various embodiments of the present disclosure.

Referring to FIG. 8, a flowchart is illustrated, such that in operation 810, an electronic device (e.g., the electronic device 101 of FIG. 1) can detect a first peripheral device. For example, the electronic device can detect a first peripheral device (e.g., a television) through a first communication module (e.g., a Bluetooth module, and/or the like) of the electronic device which supports a first communication type. For example, the electronic device can search for at least one peripheral device, which is located within the communicable distance of the first communication module and supports the first communication type, through the first communication module, and can identify, as the first peripheral device, a peripheral device having first identification information included in the group information stored in the memory (e.g., the memory 130) of the electronic device from among the searched at least one peripheral device.

In operation 820, the electronic device can acquire group information on a group of peripheral devices, to which the first peripheral device belongs, as the first peripheral device is detected. For example, the electronic device can acquire, from the memory, the group information on a group of peripheral devices, to which the first peripheral device belongs.

In operation 830, the electronic device can activate at least one corresponding communication module associated with the group. For example, in order to detect at least one other peripheral device belonging to the group, the electronic device can activate at least one communication module of the electronic device, which corresponds to the at least one other peripheral device. The activation of the communication module may imply at least one of powering-on (or turning-on) of the communication module, releasing of a restraint of a transmission function, releasing of a restraint of a reception function, and changing of a search period (e.g., change to a first mode, a search period of which is shorter than that of a basic mode, change from a second mode, a search period of which is longer than that of the basic mode, to the basic mode or the first mode, and/or the like). Further, the deactivation of the communication module may imply at least one of powering-off (or turning-off) of the communication module, restraining of a transmission function, restraining of a reception function, and changing of a search period (e.g., changing from the basic mode to the second mode).

In an embodiment, the electronic device can determine a place (e.g., the indoors such as the interior of a house, the interior of an automobile, the interior of a building, and/or the like, the outdoors, the exterior of a house, the outside, and/or the like) where the at least one other peripheral device is located, based on device identification/type information or device arrangement place information, which is included in the group information, and change the search period (a discovery period) for a peripheral device through the at least one corresponding communication module according to the determined place. For example, the electronic device can change the search period to be more rapid or slower than a basic search period (or a default search period) according to a predetermined basic mode. For example, when a place where the at least one other peripheral device is located is the indoors, the electronic device can operate in a first mode in which a peripheral device is searched for in a state in which the search period is changed to be more rapid (or, in contrast, slower) than the predetermined basic search period (or the default search period). For example, when a place where the at least one other peripheral device is located is the outdoors, the electronic device can operate in a second mode in which a peripheral device is searched for in a state in which the search period is changed to be slower (or, in contrast, more rapid) than the predetermined basic search period (or the default search period).

Referring to FIG. 9, a network environment 900 is illustrated according to various embodiments of the present disclosure. The network environment 900 includes an electronic device 901 (e.g., the electronic device 101 of FIG. 1), a first peripheral device 910 (e.g., a television), a second peripheral device 920 (e.g., an access point), a third peripheral device 930 (e.g., a temperature sensor), a fourth peripheral device 940 (e.g., a weight sensor), and a fifth peripheral device 950 (e.g., a wearable device such as a watch) which are connectable to the electronic device 901.

The electronic device 901 can include a first communication module for supporting Bluetooth communication which is a first communication type, a second communication module for supporting Wi-Fi communication which is a second communication type, a third communication module for supporting Zigbee communication which is a third communication type, and a fourth communication type for supporting NFC communication which is a fourth communication type.

For example, the electronic device 901 can establish a communication connection with the fifth peripheral device 950 through the first communication module, and then detect the first peripheral device 910 through the first communication module. Further, group information stored in a memory (e.g., the memory 130 of FIG. 1) of the electronic device 901 may include information on the first to fourth peripheral devices 910, 920, 930, and 940.

For example, the electronic device 901 can establish communication connections 961, 962, 963, 964, and 965 with first to fifth peripheral devices 910, 920, 930, 940, and 950 through the first to fourth communication modules.

The electronic device 901 can acquire group information on a group to which the first peripheral device belongs, and display, on a display 905 (e.g., the display 150 of FIG. 1) of the electronic device 901, a second list screen 970 including a plurality of items corresponding to peripheral devices belonging to the group.

For example, the second list screen 970 may include a first item 971 corresponding to the first peripheral device 910, a second item 972 corresponding to the second peripheral device 920, a third item 973 corresponding to the third peripheral device 930, a fourth item 974 corresponding to the fourth peripheral device 940, a search button 980 (or an identification button) for searching for peripheral devices in a group (i.e., for performing group searching), and a cancel button 990 for cancelling searching for the peripheral devices in the group. Each of the displayed items may include at least one of device identification information, device type information, connection information, and/or the like.

For example, when selection of the search button 980 by a user is detected, the electronic device 901 can identify communication modules, i.e., the second to fourth communication modules, which are associated with the group information and are currently deactivated, from among communication modules provided in the electronic device 901, and activate the deactivated second to fourth communication modules (i.e., perform group activation).

In an embodiment, when the fourth communication module is already activated, the electronic device can change a first search period of the fourth communication module to a second search period which is shorter than the first search period, and activate the deactivated second and third communication modules.

Each of the items may be provided in a form of a selectable button, and each of the items may include a text, an image, an icon, and/or the like, for indicating a device type, a communication type, and/or the like.

For example, a user can select at least one peripheral device to be excluded in the group searching or at least one communication module to be excluded in the group activation, by selecting (or touching) at least one item of the items included in the second list screen 970. For example, when the fourth communication module is excluded in the group activation, the electronic device 901 can activate only the deactivated second and third communication modules (i.e., perform group activation). In an embodiment, the electronic device 901 can display the already searched first peripheral device 910 or the first item 971 corresponding to the first communication module as being in an unselectable state.

In operation 840, the electronic device can detect at least one other peripheral device within the group through at least one communication module associated with the group. The operation of detecting at least one other peripheral device within the group can be performed automatically or by a user's command (or confirmation).

Referring to FIG. 9, for example, the electronic device 901 can detect the second to fourth peripheral devices 920, 930, and 940 through the second to fourth communication modules. For example, the electronic device 901 can search for at least one peripheral device, which is located within the communicable distance of the second communication module and supports the second communication type, through the second communication module, and can identify, as the second peripheral device 920, a peripheral device having second identification information included in the group information from among the searched at least one peripheral device.

The electronic device 901 can search for at least one peripheral device, which is located within the communicable distance of the third communication module and supports the third communication type, through the third communication module, and can identify, as the third peripheral device 930, a peripheral device having third identification information included in the group information from among the searched at least one peripheral device.

The electronic device 901 can search for at least one peripheral device, which is located within the communicable distance of the fourth communication module and supports the fourth communication type, through the fourth communication module, and can identify, as the fourth peripheral device 940, a peripheral device having fourth identification information included in the group information from among the searched at least one peripheral device.

In an embodiment, the electronic device can search for at least one peripheral device, which is located within a communicable distance of a corresponding communication module associated with the group and supports a corresponding communication type, through the corresponding communication module, and identify a peripheral device having the same device type as that of a corresponding peripheral device within the group from among the searched at least one peripheral device as a peripheral device with which a communication connection is to be established, when the corresponding peripheral device within the group cannot be detected from the searched at least one peripheral device.

For example, when a peripheral device of a fourth device type (e.g., a weight sensor), which has a first device ID, is registered in the group information, and the electronic device detects a peripheral device of a fourth device type, which has a second device ID, the electronic device can identify the peripheral device of the fourth device type, which has the second device ID, as a fourth peripheral device with which a communication connection is to be established.

In operation 850, the electronic device can establish communication connections with detected peripheral devices within the group. The operation of establishing the communication connections with the detected peripheral devices within the group can be performed automatically or by a user's command (or identification).

Referring to FIG. 10, a network environment 900 is illustrated, where the network environment 900 includes an electronic device 1001 (e.g., the electronic device 101 of FIG. 1), a first peripheral device 910 (e.g., a television), a second peripheral device 920 (e.g., an access point), a third peripheral device 930 (e.g., a temperature sensor), a fourth peripheral device 940 (e.g., a weight sensor), and a fifth peripheral device 950 (e.g., a wearable device such as a watch) which are connectable to the electronic device 1001.

Further, the electronic device 1001 can establish communication connections 961, 962, 963, 964, and 965 with first to fifth peripheral devices 910, 920, 930, 940, and 950 through the first to fourth communication modules. The electronic device 1001 can display a third list screen 1070 including a plurality of items corresponding to peripheral devices belonging to a predetermined group, on a display 1005 of the electronic device 1001.

For example, the third list screen 1070 may include a first item 1071 corresponding to the first peripheral device 910, a second item 1072 corresponding to the second peripheral device 920, a third item 1073 corresponding to the third peripheral device 930, a fourth item 1074 corresponding to the fourth peripheral device 940, a connection button 1080 (or a confirmation button) for communication connections with peripheral devices in a group (i.e., for performing group connection), and a cancel button 1090 for cancelling the communication connections with the peripheral devices in the group. Each of the displayed items may include at least one of device identification information, device type information, connection information, and/or the like.

For example, when selection of the connection button 1080 by a user is detected, the electronic device 1001 can identify currently connectable peripheral devices belonging to the group, i.e., the first to fourth peripheral devices 910, 920, 930, and 940, and establish the communication connections 961, 962, 963, and 964 (i.e., a group connection) with the first to fourth peripheral devices 910, 920, 930, and 940.

Each of the items may be provided in a form of a selectable button, and each of the items may include a text, an image, an icon, and/or the like, for indicating a device type, a communication type, and/or the like.

For example, a user can select at least one peripheral device to be excluded in the group connection, by selecting (or touching) at least one item of the items included in the third list screen 1070. For example, when the fourth peripheral device 940 is excluded in the group connection, the electronic device 901 can establish only communication connections with the first to third peripheral devices 910, 920, and 930.

Figure 11:
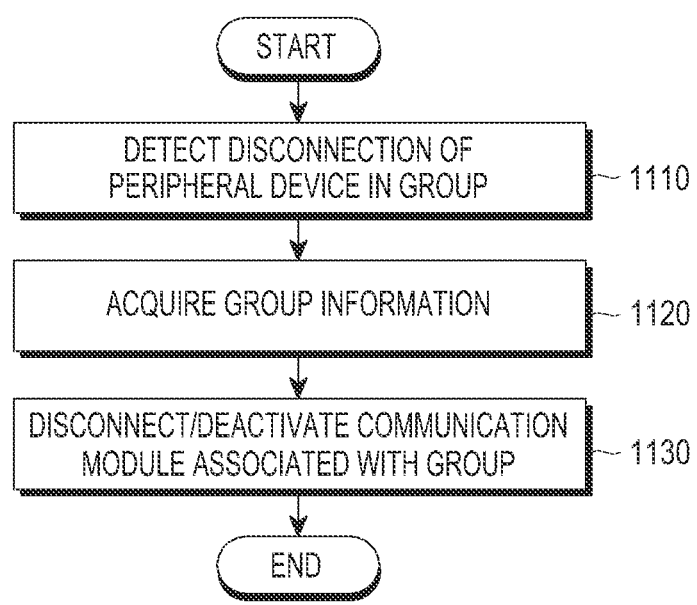
FIG. 11 is a flowchart illustrating a communication control method according to an embodiment of the present disclosure.

FIG. 11 is a flowchart illustrating a communication control method according to an embodiment of the present disclosure.

Referring to FIG. 11, a flowchart is illustrated, such that in operation 1110, an electronic device (e.g., the electronic device 101 of FIG. 1) can detect a disconnection with a first peripheral device in a predetermined group. For example, the electronic device can detect disconnection between a first peripheral device (e.g., a television) and a first communication module (e.g., a Bluetooth module, and/or the like) of the electronic device which supports a first communication type. The disconnection may be generated as a distance between the electronic device and the first peripheral device exceeds a communicable distance of the first communication module, or may be generated by a user input (e.g., reception of a disconnection command from a user, powering-off (or turning-off) of the first peripheral device, and/or the like) through the first peripheral device.

In operation 1120, the electronic device can acquire group information on a group of peripheral devices, to which the disconnected peripheral device belongs, as the disconnection with the first peripheral device is detected. For example, the electronic device can acquire, from a memory (e.g., the memory 130 of FIG. 1) of the electronic device, the group information on the group of peripheral devices, to which the first peripheral device belongs.

In operation 1130, the electronic device may release a communication connection with at least one peripheral device in the group or deactivate at least one communication module associated with the group. The electronic device can start operations of disconnection with at least one peripheral device in the group and/or deactivation of at least one communication module associated with the group as disconnection with another peripheral device (e.g., a standard peripheral device or a predetermined peripheral device) or all of peripheral devices in the group are detected. The operation of the releasing of the communication connection and/or the deactivation of the communication module can be performed automatically or by a user's command (or confirmation).

Figure 12:
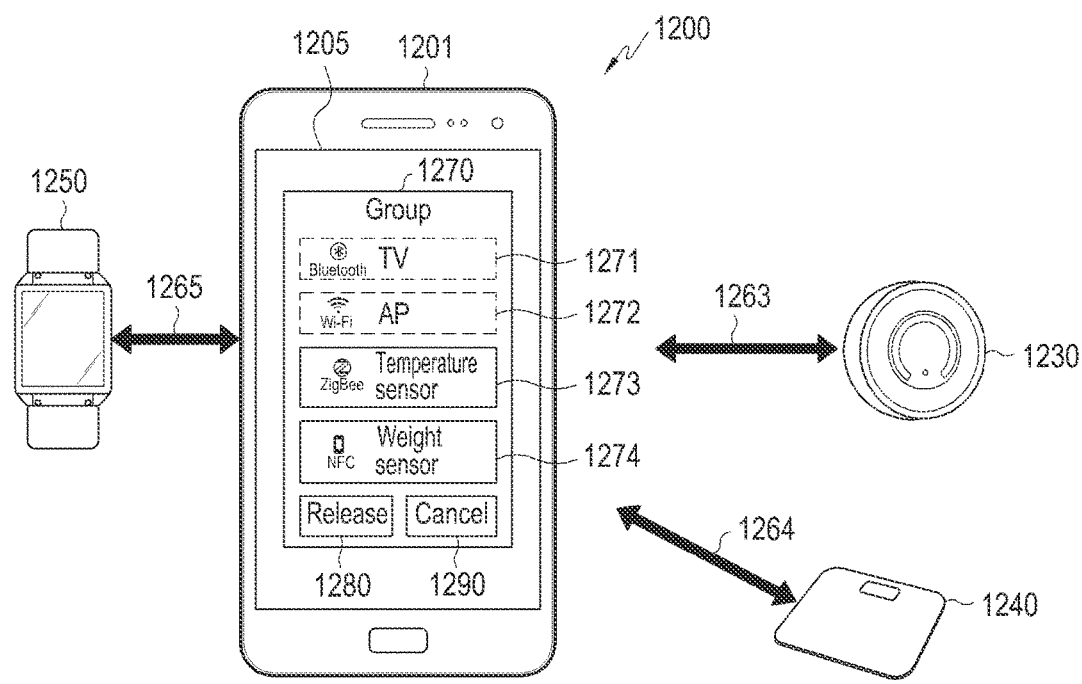
FIGS. 12 and 13 are views describing a communication control method according to various embodiments of the present disclosure.
Figure 13:
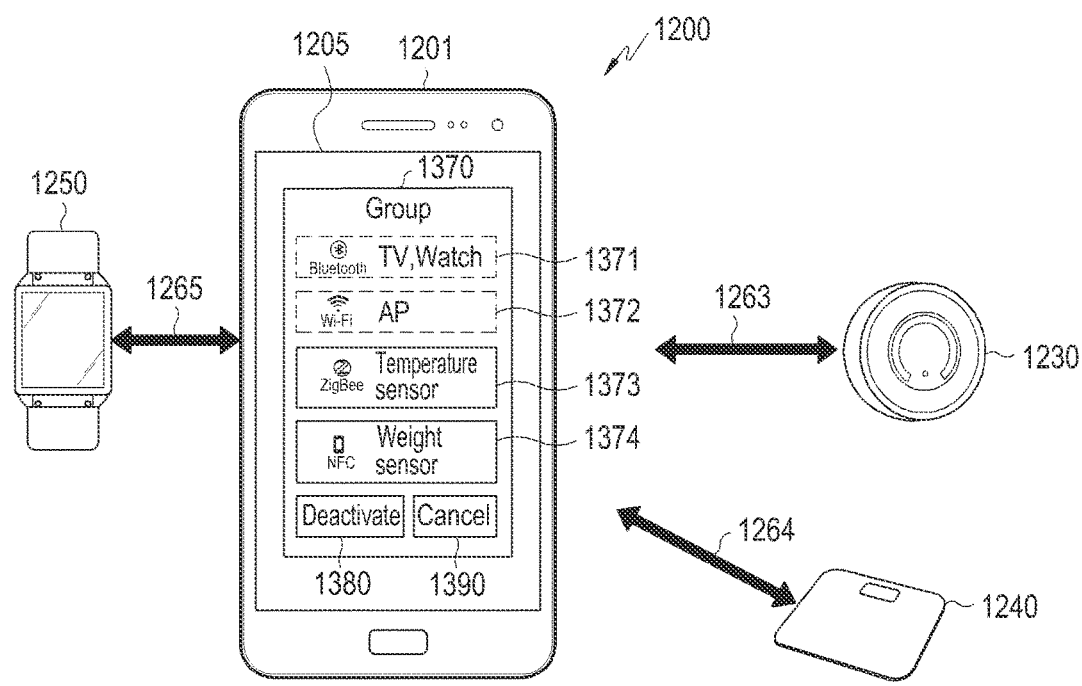

FIGS. 12 and 13 are views describing a communication control method according to various embodiments of the present disclosure.

Referring to FIG. 12, a network environment 1200 is illustrated according to an embodiment of the present disclosure. The network environment 1200 includes an electronic device 1201 (e.g., the electronic device 101 of FIG. 1), a third peripheral device 1230 (e.g., a temperature sensor), a fourth peripheral device 1240 (e.g., a weight sensor), and a fifth peripheral device 1250 (e.g., a wearable device such as a watch) which are connectable to the electronic device 1201.

The electronic device 1201 may include a first communication module which supports a first communication type (e.g., Bluetooth communication), a second communication module which supports a second communication type (e.g., Wi-Fi communication), a third communication module which supports a third communication type (e.g., Zigbee communication), and a fourth communication module which supports a fourth communication type (e.g., NFC communication).

For example, a first communication connection between a first peripheral device (e.g., a television) and the electronic device 1201 can be established through the first communication module, a second communication connection between a second peripheral device (e.g., an access point) and the electronic device can be established through the second communication module, a third communication connection 1263 between a third peripheral device 1230 (e.g., a temperature sensor) and the electronic device 1201 can be established through the third communication module, a fourth communication connection 1264 between a fourth peripheral device 1240 (e.g., a weight sensor) and the electronic device 1201 can be established through the fourth communication module, and a fifth communication connection 1265 between a fifth peripheral device 1250 (e.g., a wearable device such as a watch) and the electronic device 1201 can be established through the first communication module. Thereafter, the first and second communication connections can be released, and the third to fifth communication connections 1263, 1264, and 1265 can be maintained.

The electronic device 1201 can display a fourth list screen 1270 including a plurality of items corresponding to peripheral devices belonging to a predetermined group, on a display 1205 of the electronic device 1201.

For example, the fourth list screen 1270 may include a first item 1271 corresponding to a first peripheral device, a second item 1272 corresponding to a second peripheral device, a third item 1273 corresponding to a third peripheral device 1230, a fourth item 1274 corresponding to a fourth peripheral device 1240, a release button 1280 (or confirmation button) for releasing communication connections with peripheral devices in the group (i.e., for performing group release), and a cancel button 1290 for cancelling the releasing of the communication connections with the peripheral devices in the group (i.e., for cancelling the group release). Each of the displayed items may include at least one of device identification information, device type information, connection information, and/or the like.

For example, when a selection of the release button 1280 by a user is detected, the electronic device 1201 can identify currently connected peripheral devices belonging to the group, i.e., the third and fourth peripheral devices 1230 and 1240, and release third and fourth communication connections 1263 and 1264 (i.e., group connection) with the third and fourth peripheral devices 1230 and 1240 (i.e., perform group release).

Each of the items may be provided in a form of a selectable button, and each of the items may include a text, an image, an icon, and/or the like, for indicating a device type, a communication type, and/or the like.

For example, a user can select at least one peripheral device to be excluded in the group release, by selecting (or touching) at least one item of the items included in the fourth list screen 1270. For example, when the fourth peripheral device 1240 is excluded in the group release, the electronic device 1201 can release only a communication connection 1263 with the third peripheral devices 1230.

For example, since communication connections with a first peripheral device and a second peripheral device are already released, the electronic device 1201 can display the first item 1271 and the second item 1272 as an unselectable state.

Referring to FIG. 13, a network environment 1200 is illustrated according to an embodiment of the present disclosure. The network environment 1200 includes an electronic device 1201 (e.g., the electronic device 101 of FIG. 1), a third peripheral device 1230 (e.g., a temperature sensor), a fourth peripheral device 1240 (e.g., a weight sensor), and a fifth peripheral device 1250 (e.g., a wearable device such as a watch) which are connectable to the electronic device 1201.

Furthermore, as illustrated in FIG. 13, a first communication connection between a first peripheral device (e.g., a television) and the electronic device 1201 can be established through a first communication module which supports a first communication type (e.g., Bluetooth communication), a second communication connection between a second peripheral device (e.g., an access point) and the electronic device can be established through a second communication module which supports a second communication type (e.g., Wi-Fi communication), a third communication connection 1263 between the third peripheral device 1230 (e.g., a temperature sensor) and the electronic device 1201 can be established through a third communication module which supports a third communication type (e.g., Zigbee communication), a fourth communication connection 1264 between the fourth peripheral device 1240 (e.g., a weight sensor) and the electronic device 1201 can be established through a fourth communication module which supports a fourth communication type (e.g., NFC communication), and a fifth communication connection 1265 between the fifth peripheral device 1250 (e.g., a wearable device such as a watch) and the electronic device 1201 can be established through the first communication module. Thereafter, the first and second communication connections can be released, and the third to fifth communication connections 1263, 1264, and 1265 can be maintained.

The electronic device 1201 can display a fifth list screen 1370 including a plurality of items corresponding to peripheral devices belonging to a predetermined group, on a display 1205 of the electronic device 1201.

For example, the fifth list screen 1370 may include a first item 1371 corresponding to a first communication module, a second item 1372 corresponding to a second communication module, a third item 1373 corresponding to a third communication module, a fourth item 1374 corresponding to a fourth communication module, a deactivate button 1380 (or identification button) for deactivating communication modules associated with a predetermined group (i.e., for performing group deactivation), and a cancel button 1390 for cancelling the deactivating of the communication modules associated with the group (i.e., for cancelling the group deactivation). Each of the displayed items may include at least one of device identification information, device type information, connection information, and/or the like.

For example, when a selection of the deactivate button 1380 by a user is detected, the electronic device 1201 can identify currently activated communication modules associated with the group, i.e., first, third, and fourth communication modules, and deactivate the third and fourth communication modules. For example, since the first communication module is communication-connected to the fifth peripheral device 1250 which is a wearable device, the electronic device 1201 can display the first item 1371 as an unselectable state. For example, since the second communication module is not activated, the electronic device 1201 can display the second item 1372 as an unselectable state.

Each of the items may be provided in a form of a selectable button, and each of the items may include a text, an image, an icon, and/or the like, for indicating a device type, a communication type, and/or the like.

For example, a user can select at least one peripheral device to be excluded in the group deactivation, by selecting (or touching) at least one item of the items included in the fifth list screen 1370. For example, when the third communication module is excluded in the group deactivation, the electronic device 1201 can deactivate only the fourth communication module.

According to various embodiments of the present disclosure, a communication control method of an electronic device includes detecting, by a processor of the electronic device, a first peripheral device through a first communication module, of the electronic device, which supports a first communication type, acquiring group information on a group of peripheral devices, to which the first peripheral device belongs, based on first identification information of the first peripheral device; and detecting a second peripheral device belonging to the group through a second communication module, of the electronic device, which supports a second communication type, based on the group information.

According to various embodiments of the present disclosure, the detecting of the first peripheral device includes searching for at least one peripheral device through the first communication module, and identifying, as the first peripheral device, a peripheral device having the first identification information from among the searched at least one peripheral device.

According to various embodiments of the present disclosure, the detecting of the first peripheral device includes periodically activating the first communication module, searching for at least one peripheral device through the activated first communication module, and identifying, as the first peripheral device, a peripheral device having the first identification information from among the searched at least one peripheral device.

According to various embodiments of the present disclosure, the group information includes the first identification information and second identification information of the second peripheral device, and the detecting of the second peripheral device includes searching for at least one peripheral device through the second communication module, and identifying, as the second peripheral device, a peripheral device having the second identification information from among the searched at least one peripheral device.

According to various embodiments of the present disclosure, the group information includes the first identification information, first device type information associated with the first peripheral device, second identification information of the second peripheral device, and second device type information associated with the second peripheral device, and the detecting of the second peripheral device includes searching for at least one peripheral device through the second communication module, and when a peripheral device having the second identification information from among the searched at least one peripheral device does not exist, and identifying, as the second peripheral device, a peripheral device having the second device type information from among the searched at least one peripheral device.

According to various embodiment of the present disclosure, the detecting of the second peripheral device includes activating the second communication modules, and searching for at least one peripheral device through the activated second communication module.

According to various embodiments of the present disclosure, the detecting of the second peripheral device includes changing a first search period of the second communication module for searching for peripheral devices to a second search period that is shorter than the first search period, and searching for at least one peripheral device according to the second search period through the second communication module.

According to various embodiments of the present disclosure, the method further includes establishing a first communication connection with the first peripheral device through the first communication module, and establishing a second communication connection with the second peripheral device through the second communication module.

According to various embodiments of the present disclosure, the method further includes establishing a first communication connection with the first peripheral device through the first communication module, and establishing a second communication connection with the second peripheral device through the second communication module, wherein the acquiring of the group information may start by the establishing of the first communication connection.

According to various embodiments of the present disclosure, the method further includes detecting a third peripheral device through a third communication module of the electronic device which supports a third communication type, based on the group information, and establishing a communication connection with the third peripheral device through the third communication module.

According to various embodiments of the present disclosure, the method further includes displaying search/connection states of peripheral devices in the group.

According to various embodiments of the present disclosure, the method further includes displaying search/connection states of peripheral devices in the group, detecting a selection of at least one of the peripheral devices in the group, and establishing a communication connection with at least one of the first and second peripheral devices according to the selection.

According to various embodiments of the present disclosure, the method further includes establishing communication connections with the first and second peripheral devices, and deactivating a third communication module of the electronic device, which supports a third communication type, based on the group information.

According to various embodiments of the present disclosure, the method further includes establishing a first communication connection with the first peripheral device through the first communication module, establishing a second communication connection with the second peripheral device through the second communication module, detecting a release of the first communication connection through the first communication module after the establishing of the first and second communication connections, and releasing the second communication connection through the second communication module according to the release of the first communication connection.

According to various embodiments of the present disclosure, the method further includes establishing a first communication connection with the first peripheral device through the first communication module, establishing a second communication connection with the second peripheral device through the second communication module, detecting a release of the first communication connection through the first communication module after the establishing of the first and second communication connections; and deactivating the second communication module according to the release of the first communication connection.

According to various embodiments of the present disclosure, the method further includes establishing a first communication connection with the first peripheral device through the first communication module, establishing a second communication connection with the second peripheral device through the second communication module, detecting a release of communication connections with all peripheral devices in the group after the establishing of the first and second communication connections, and deactivating the second communication module according to the release of the communication connections.

According to various embodiments of the present disclosure, an electronic device may include a first communication module configured to support a first communication type, a second communication module configured to support a second communication module, and a processor configured to detect a first peripheral device through the first communication module, acquire group information on a group of peripheral devices, to which the first peripheral device belongs, based on first identification information of the first peripheral device, and detect a second peripheral device belonging to the group through the second communication module based on the group information.

According to various embodiment of the present disclosure, the processor can be further configured to search for at least one peripheral device through the first communication module, and identify, as the first peripheral device, a peripheral device having the first identification information from among the searched at least one peripheral device.

According to various embodiment of the present disclosure, the processor can be further configured to periodically activate the first communication module, search for at least one peripheral device through the activated first communication module, and identify, as the first peripheral device, a peripheral device having the first identification information from among the searched at least one peripheral device.

According to various embodiments of the present disclosure, the group information includes the first identification information and second identification information of the second peripheral device, and the processor can be further configured to search for at least one peripheral device through the second communication module; and identify, as the second peripheral device, a peripheral device having the second identification information from among the searched at least one peripheral device.

According to various embodiments of the present disclosure, the group information includes the first identification information, first device type information associated with the first peripheral device, second identification information of the second peripheral device, and second device type information associated with the second peripheral device, and the processor can be further configured to search for at least one peripheral device through the second communication module, and when a peripheral device having the second identification information from among the searched at least one peripheral device does not exist, identify, as the second peripheral device, a peripheral device having the second device type information from among the searched at least one peripheral device.

According to various embodiments of the present disclosure, the processor can be further configured to activate the second communication module, and search for at least one peripheral device through the activated second communication module.

According to various embodiments of the present disclosure, the processor can be further configured to change a first search period of the second communication module for searching for peripheral devices to a second search period that is shorter than the first search period, and search for at least one peripheral device according to the second search period through the second communication module.

According to various embodiments of the present disclosure, the processor can be further configured to establish a first communication connection with the first peripheral device through the first communication module, and establish a second communication connection with the second peripheral device through the second communication module.

According to various embodiments of the present disclosure, the processor can be further configured to establish a first communication connection with the first peripheral device through the first communication module, establish a second communication connection with the second peripheral device through the second communication module, and acquire the group information after the establishing of the first communication connection.

According to various embodiments of the present disclosure, the processor can be further configured to detect a third peripheral device through a third communication module of the electronic device, which supports a third communication type, based on the group information, and establish a communication connection with the third peripheral device.

According to various embodiments of the present disclosure, the electronic device further includes a display, and the processor can be further configured to display search/connection states of peripheral devices in the group through the display.

According to various embodiments of the present disclosure, the electronic device further includes a display, and the processor can be further configured to display search/connection states of peripheral devices in the group through the display, detect selection for at least one of the peripheral devices in the group, and make a communication connection with at least one of the first and second peripheral devices according to the selection.

According to various embodiments of the present disclosure, the processor can be further configured to establish communication connections with the first and second peripheral devices, and deactivate a third communication module of the electronic device, which supports a third communication type, based on the group information.

According to various embodiments of the present disclosure, the processor can be further configured to establish a first communication connection with the first peripheral device through the first communication module, establish a second communication connection with the second peripheral device through the second communication module, detect a release of the communication connection after the establishing of the first and second communication connections, and deactivate the second communication module according to the release of the communication connections.

According to various embodiments of the present disclosure, the processor can be further configured to establish a first communication connection with the first peripheral device through the first communication module, establish a second communication connection with the second peripheral device through the second communication module, detect a release of the communication connection after the establishing of the first and second communication connections, and deactivate the second communication module according to the release of the communication connections.

Figure 14:
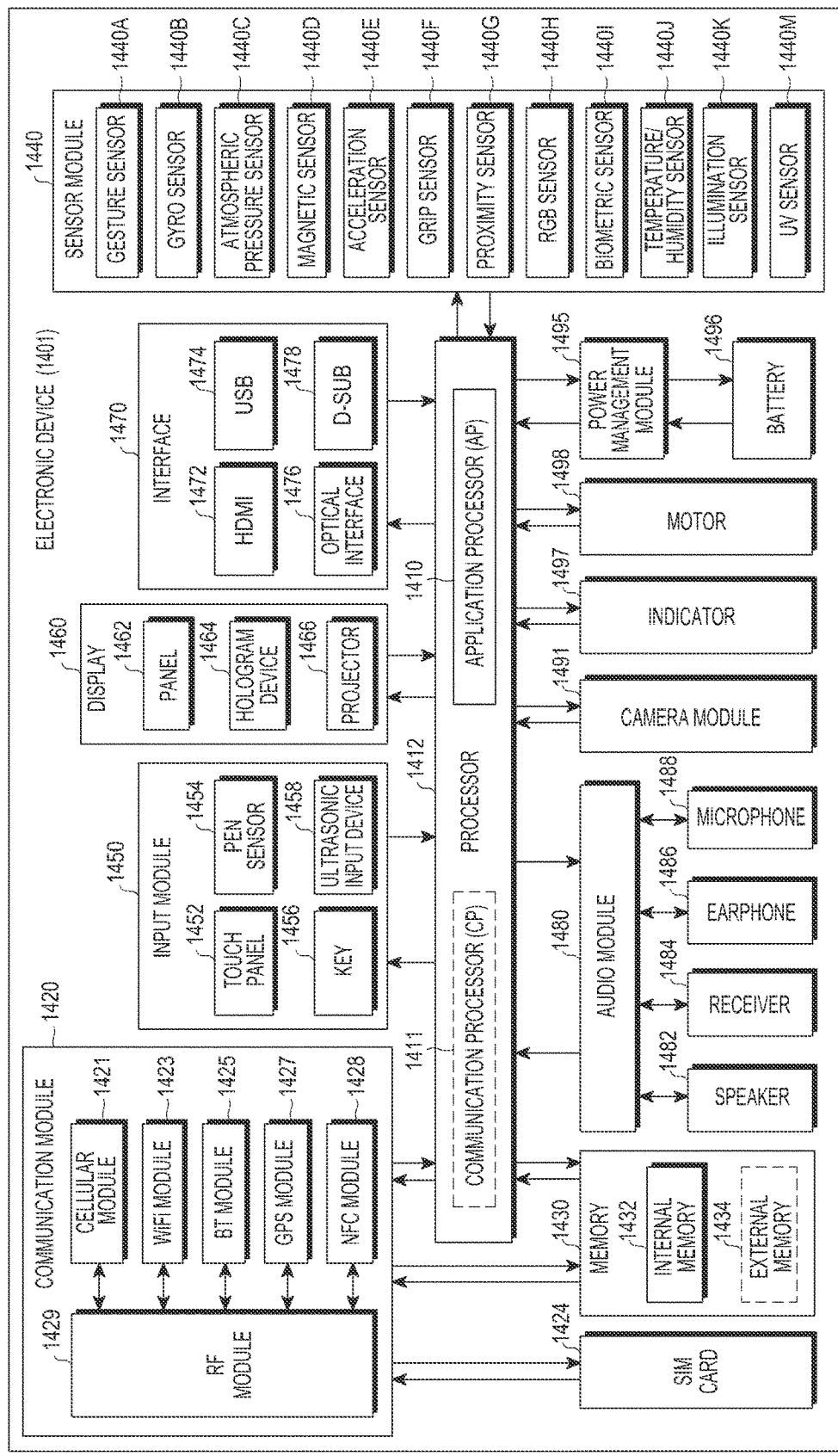
FIG. 14 is a block diagram of an electronic device according to an embodiment of the present disclosure.

FIG. 14 is a block diagram of an electronic device according to an embodiment of the present disclosure. The electronic device may form, for example, a part or the entirety of the electronic device 101 illustrated in FIG. 1.

Referring to FIG. 14, an electronic device 1401 is illustrated, where the electronic device 1401 may include at least one of a processor 1412 including one or more application processors (APs) 1410 and/or one or more communication processors (CPs) 1411, a communication module 1420, a subscriber identifier module (SIM) card 1424, a memory 1430, a sensor module 1440, an input module 1450, a display 1460, an interface 1470, an audio module 1480, a camera module 1491, a power management module 1495, a battery 1496, an indicator 1497, and a motor 1498.

The AP 1410 may control a plurality of hardware or software elements connected thereto by driving an operating system or an application program, process various types of data including multimedia data, and perform calculations. The AP 1410 may be embodied as, for example, a system on chip (SoC). According to an embodiment of the present disclosure, the AP 1410 may further include a graphic processing unit (GPU; not illustrated).

The communication module 1420 (for example, the communication interface 160 of FIG. 1) may perform data transmission/reception in communication between the electronic device 1401 (for example, the electronic device 101) and other electronic devices (for example, the electronic device 104 and the server 106 of FIG. 1) connected over a network. According to an embodiment, the communication module 1420 may include at least one of a cellular module 1421, a Wi-Fi module 1423, a Bluetooth (BT) module 1425, a global positioning system (GPS) module 1427, a near field communication (NFC) module 1428, and a radio frequency (RF) module 1429.

The cellular module 1421 may provide at least one of a voice call, a video call, a message service, and an Internet service through a communication network (for example, LTE, LTE-A, CDMA, WCDMA, UMTS, WiBro, GSM, or the like). Also, the cellular module 1421 may identify and authenticate an electronic device in a communication network using, for example, a subscriber identification module (for example, the SIM card 1424). According to an embodiment, the cellular module 1421 may perform at least some of functions which the AP 1410 may provide. For example, the cellular module 1421 may perform at least a part of the multimedia control function.

According to an embodiment, the CP 1411 may be included in the cellular module 1421. Furthermore, the cellular module 1421 may be embodied as, for example, an SoC. Although the elements such as the cellular module 1421 (for example, the communication processor 1411), the memory 1430, and the power management module 1495 are illustrated to be separate from the AP 1410 in FIG. 14, the AP 1410 may be implemented to include at least some of the above described elements (for example, the cellular module 1410) according to one embodiment.

According to an embodiment, the AP 1410 or the cellular module 1421 (for example, the CP 1411) may load commands or data received from at least one of a non-volatile memory and other components connected thereto to a volatile memory, and may process the loaded commands or data. Further, the AP 1410 or the cellular module 1421 may store, in a non-volatile memory, data received from or generated by at least one of the other component elements.

Each of the Wi-Fi module 1423, the BT module 1425, the GPS module 1427, or the NFC module 1428 may include, for example, a processor for processing data transmitted/received through a corresponding module. Although the cellular module 1421, the Wi-Fi module 1423, the BT module 1425, the GPS module 1427, and the NFC module 1428 are illustrated as individual blocks in FIG. 14, at least some (e.g., two or more) of the cellular module 1421, the Wi-Fi module 1423, the BT module 1425, the GPS module 1427, and the NFC module 1428 may be included within one integrated chip (IC) or one IC package according to one embodiment. For example, at least some (for example, the CP 1421 corresponding to the cellular module 1423 and a Wi-Fi processor corresponding to the Wi-Fi module 1425) processors corresponding to the cellular module 1421, the Wi-Fi module 1423, the BT module 1425, the GPS module 1427, and the NFC module 1428, respectively, may be implemented as one SoC.

The RF module 1429 may transmit/receive data, for example, an RF signal. Although not illustrated, the RF module 1429 may include at least one of, for example, a transceiver, a power amp module (PAM), a frequency filter, a low noise amplifier (LNA) and/or the like. Further, the RF unit 1429 may further include a component for transmitting/receiving an electromagnetic wave in free air space in radio communication, such as at least one of a conductor, a conducting wire and/or the like. Although the cellular module 1421, the Wi-Fi module 1423, the BT module 1425, the GPS module 1427, and the NFC module 1428 are illustrated to share one RF module 1429 in FIG. 14, at least one of the cellular module 1421, the Wi-Fi module 1423, the BT module 1425, the GPS module 1427, and the NFC module 1428 may transmit/receive the RF signal through a separate RF module according to one embodiment.

The SIM card 1424 may be a card including a subscriber identification module and may be inserted into a slot formed in a particular portion of the electronic device. The SIM card 1424 may include unique identification information (for example, an integrated circuit card identifier (ICCID)) or subscriber information (for example, an international mobile subscriber identity (IMSI)).

The memory 1430 (for example, the memory 130 of FIG. 1) may include an embedded (internal) memory 1432 or an external memory 1434. The embedded memory 1432 may include at least one of, for example, a volatile memory (for example, a dynamic random access memory (DRAM), a static RAM (SRAM), a synchronous dynamic RAM (SDRAM), and/or the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and/or the like).

According to an embodiment, the embedded memory 1432 may be a solid state drive (SSD). The external memory 1434 may further include a flash drive, for example, at least one of a compact flash (CF), a secure digital (SD), a micro secure digital (Micro-SD), a mini secure digital (Mini-SD), an extreme digital (xD), a memory stick and/or the like. The external memory 1434 may be functionally connected to the electronic device 1401 through various interfaces. According to an embodiment, the electronic device 1401 may further include a storage device (or storage medium) such as a hard drive.

The sensor module 1440 may measure a physical quantity or detect an operating state of the electronic device 1401, and convert the measured or detected information into an electronic signal. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (for example, a red/green/blue (RGB) sensor), a biometric sensor 1440I, a temperature/humidity sensor 1440J, an illumination sensor 1440K, and an ultra violet (UV) sensor 1440M.

Additionally or alternatively, the sensor module 1440 may include, for example, an E-nose sensor (not illustrated), an electromyography (EMG) sensor (not illustrated), an electroencephalogram (EEG) sensor (not illustrated), an electrocardiogram (ECG) sensor (not illustrated), an infrared (IR) sensor (not illustrated), an iris sensor (not illustrated), a fingerprint sensor (not illustrated) and/or the like. The sensor module 1440 may further include a control circuit for controlling at least one sensor included therein.

The input module 1450 may include a touch panel 1452, a (digital) pen sensor 1454, a key 1456, or an ultrasonic input device 1458. The touch panel 1452 may recognize a touch input through at least one of, for example, a capacitive type, a resistive type, an infrared type, and an ultrasonic type. The touch panel 1452 may further include a control circuit. In the case of the capacitive type, physical contact or proximity recognition is possible. The touch panel 1452 may further include a tactile layer. In this case, the touch panel 1452 may provide a tactile reaction to a user.

The (digital) pen sensor 1454 may be implemented, for example, using a method that is the same as or similar to receiving a user's touch input, or using a separate recognition sheet. The key 1456 may include, for example, a physical button, an optical key or a keypad. The ultrasonic input device 1458 is a unit that may identify data by detecting a sonic wave through a microphone (for example, a microphone 1488) in the electronic device 1401, through an input tool which generates an ultrasonic signal, and is capable of wireless recognition. According to an embodiment, the electronic device 1401 may receive a user input from an external electronic device (for example, computer or server) connected thereto by using the communication module 1420.

The display 1460 (e.g., the display 150 of FIG. 1) may include a panel 1462, a hologram device 1464, or a projector 1466. The panel 1462 may be, for example, a liquid crystal display (LCD), active-matrix organic light emitting diode (AM-OLED), or the like. The panel 1462 may be embodied to be, for example, flexible, transparent, or wearable. The panel 1462 may also be integrated with the touch panel 1452 as a single module. The hologram device 1464 may show a stereoscopic image in the air using interference of light. The projector 1466 may project light onto a screen to display an image. For example, the screen may be located inside or outside the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a c-subminiature (D-sub) 1478. The interface 1470 may be included in, for example, the communication interface 160 illustrated in FIG. 1. Additionally or alternatively, the interface 1470 may include, for example, a mobile high-definition Link (MHL) interface, a secure digital (SD) card/multi-media card (MMC) interface, or an Infrared Data Association (IrDA) standard interface.

The audio module 1480 may bilaterally convert a sound and an electronic signal. At least some components of the audio module 1480 may be included in, for example, the input/output interface 140 illustrated in FIG. 1. The audio module 1480 may process sound information input or output through, for example, at least one of a speaker 1482, a receiver 1484, an earphone 1486, the microphone 1488, and/or the like.

The camera module 1491 is a device which may photograph a still image and a video. According to an embodiment, the camera module 1491 may include one or more image sensors (for example, a front sensor or a rear sensor), a lens (not illustrated), an image signal processor (ISP) (not illustrated) or a flash (not illustrated) (for example, an LED or xenon lamp).

The power management module 1495 may manage electric power of the electronic device 1401. Although not illustrated, the power management module 1495 may include, for example, a power management integrated circuit (PMIC), a charger integrated circuit (IC), or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment, the charger IC may include a charger IC for at least one of the wired charging method and the wireless charging method. Examples of the wireless charging may include magnetic resonance charging, magnetic induction charging, and electromagnetic charging, and an additional circuit for wireless charging, such as a coil loop, a resonance circuit, a rectifier or the like, may be added.

The battery gauge may measure, for example, a residual quantity of the battery 1496, a voltage, a current, or a temperature during charging. The battery 1496 may store or generate electricity and supply electric power to the electronic device 1401 using the stored or generated electricity. The battery 1496 may include, for example, a rechargeable battery or a solar battery.

The indicator 1497 may display a particular status of the electronic device 1401 or a part thereof (for example, the AP 1410), for example, at least one of a booting status, a message status, a charging status and/or the like. The motor 1498 may convert an electric signal into mechanical vibration. Although not illustrated, the electronic device 1401 may include a processing device (for example, a GPU) for supporting a mobile TV. The processing device for supporting the mobile TV may process media data according to standards, for example, a digital multimedia broadcasting (DMB), a digital video broadcasting (DVB), a media flow, or the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The term "module" used in the various embodiments of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the various embodiments of the present disclosure may include at least one of an application-specific integrated circuit (ASIC) chip, a field-programmable gate arrays (FPGA), and a programmable-logic device for performing operations which have been known or are to be developed hereinafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the command is executed by one or more processors (for example, the processor 120), the one or more processors may execute a function corresponding to the command. The computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, provided is a storage medium in which commands are stored. The commands may be configured to perform at least one operation by at least one processor when being executed by the at least one processor. The at least one operation may include detecting a first peripheral device through a first communication module of the electronic device, which supports a first communication type; acquiring group information on a group of peripheral devices, to which the first peripheral device belongs, based on identification information of the first peripheral device; and detecting a second peripheral device belonging to the group through a second communication module of the electronic device, which supports a second communication type, based on the group information.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include ROM, RAM, CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include ROM, RAM, CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling communication of an electronic device, the method comprising:
    in response to wirelessly searching for at least one peripheral device by using a first communicator of the electronic device, detecting, by a processor of the electronic device, a first peripheral device through the first communicator, which supports a first communication type;
    acquiring group information on peripheral devices in a group, to which the first peripheral device belongs, among at least two groups registered in the electronic device, based on first identification information of the first peripheral device;
    detecting a second peripheral device belonging to the group through a second communicator, of the electronic device, which supports a second communication type, based on the group information;
    establishing a first communication connection with the first peripheral device through the first communicator;
    establishing a second communication connection with the second peripheral device through the second communicator;
    detecting a release of the first communication connection through the first communicator after the establishing of the first communication connection and the second communication connection; and
    deactivating the second communicator or releasing the second communication connection through the second communicator according to the release of the first communication connection.

2. The method of claim 1,
    wherein the group information comprises the first identification information and second identification information of the second peripheral device, and
    wherein the detecting of the second peripheral device comprises:
        searching for at least one peripheral device through the second communicator, and
        identifying, as the second peripheral device, a peripheral device having the second identification information from among the searched at least one peripheral device.

3. The method of claim 1,
    wherein the group information comprises:
        the first identification information,
        first device type information associated with the first peripheral device,
        second identification information of the second peripheral device, and
        second device type information associated with the second peripheral device, and wherein the detecting of the second peripheral device comprises:
 searching for at least one peripheral device through the second communicator, and
 identifying, as the second peripheral device, a peripheral device having the second device type information from among the searched at least one peripheral device, when the peripheral device having the second identification information from among the searched at least one peripheral device does not exist.

4. The method of claim 1, wherein the detecting of the second peripheral device comprises:
 activating the second communicator based on the group information, and
 searching for at least one peripheral device through the activated second communicator.

5. The method of claim 1, wherein the detecting of the second peripheral device comprises:
 changing a first search period of the second communicator for searching for peripheral devices to a second search period that is shorter than the first search period, and
 searching for at least one peripheral device according to the second search period through the second communicator.

6. The method of claim 1, further comprising:
 displaying search states of the peripheral devices in the group; and
 detecting a selection of at least one of the peripheral devices in the group.

7. The method of claim 1, further comprising:
 deactivating a third communicator of the electronic device, which supports a third communication type, based on the group information.

8. The method of claim 1,
 wherein the first communicator comprises one of a Bluetooth communicator, a communicator supporting an IEEE 802.11 standard, a Zigbee communicator, and a near field communication (NFC) communicator, and
 wherein the second communicator comprises another of the Bluetooth communicator, the communicator supporting the IEEE 802.11 standard, the Zigbee communicator, and the NFC communicator.

9. A non-transitory computer-readable storage medium storing instructions that, when executed, cause at least one processor to perform a method, the method comprising:
 in response to wirelessly searching for at least one peripheral device by using a first communicator of an electronic device, detecting, by a processor of the electronic device, a first peripheral device through the first communicator, which supports a first communication type;
 acquiring group information on peripheral devices in a group, to which the first peripheral device belongs, among at least two groups registered in the electronic device, based on first identification information of the first peripheral device;
 detecting a second peripheral device belonging to the group through a second communicator, of the electronic device, which supports a second communication type, based on the group information;
 establishing a first communication connection with the first peripheral device through the first communicator;
 establishing a second communication connection with the second peripheral device through the second communicator;
 detecting a release of the first communication connection through the first communicator after the establishing of the first communication connection and the second communication connection; and
 deactivating the second communicator or releasing the second communication connection through the second communicator according to the release of the first communication connection.

10. An electronic device comprising:
a first communicator configured to support a first communication type;
a second communicator configured to support a second communication type; and
a processor configured to:
 in response to wirelessly searching for at least one peripheral device by using a first communicator of the electronic device, detect a first peripheral device through the first communicator,
 acquire group information on peripheral devices in a group, to which the first peripheral device belongs, among at least two groups registered in the electronic device, based on first identification information of the first peripheral device,
 detect a second peripheral device belonging to the group through the second communicator based on the group information,
 establish a first communication connection with the first peripheral device through the first communicator,
 establish a second communication connection with the second peripheral device through the second communicator,
 detect a release of the first communication connection through the first communicator after the establishing of the first communication connection and the second communication connection, and
 deactivate the second communicator or release the second communication connection through the second communicator according to the release of the first communication connection.

11. The electronic device of claim 10,
wherein the group information comprises the first identification information and second identification information of the second peripheral device, and
wherein the processor is further configured to:
 search for at least one peripheral device through the second communicator, and
 identify, as the second peripheral device, a peripheral device having the second identification information from among the searched at least one peripheral device.

12. The electronic device of claim 10,
wherein the group information comprises:
 the first identification information,
 first device type information associated with the first peripheral device,
 second identification information of the second peripheral device, and
 second device type information associated with the second peripheral device, and
wherein the processor is further configured to:
 search for at least one peripheral device through the second communicator, and
 identify, as the second peripheral device, a peripheral device having the second device type information from among the searched at least one peripheral device, when the peripheral device having the second device type information from among the searched at least one peripheral device does not exist.

13. The electronic device of claim 10, wherein the processor is further configured to:
   activate the second communicator based on the group information, and
   search for at least one peripheral device through the activated second communicator.

14. The electronic device of claim 10, wherein the processor is further configured to:
   change a first search period of the second communicator for searching for peripheral devices to a second search period that is shorter than the first search period, and
   search for at least one peripheral device according to the second search period through the second communicator.

15. The electronic device of claim 10, further comprising:
a display,
   wherein the processor is further configured to display search states of the peripheral devices in the group through the display.

16. The electronic device of claim 10, further comprising:
a display,
   wherein the processor is further configured to:
      display search states of the peripheral devices in the group through the display, and
      detect a selection of at least one of the peripheral devices in the group.

17. The electronic device of claim 10, wherein the processor is further configured to:
   deactivate a third communicator of the electronic device, which supports a third communication type, based on the group information.

* * * * *